US012592664B2

(12) United States Patent
Hiura et al.

(10) Patent No.: US 12,592,664 B2
(45) Date of Patent: Mar. 31, 2026

(54) SOLAR POWER GENERATION SYSTEM AND REFLECTOR FOR SOLAR POWER GENERATION SYSTEM

(71) Applicants: NICHIMO Corporation, Tokyo (JP); C. I. TAKIRON Corporation, Osaka (JP); C. I. TAKIRONCIVIL Corporation, Osaka (JP)

(72) Inventors: Ichiro Hiura, Tokyo (JP); Takahiro Koinouchi, Tokyo (JP); Takaaki Nakai, Osaka (JP); Kohei Onishi, Osaka (JP); Yuki Hyuga, Osaka (JP)

(73) Assignees: NICHIMO CORPORATION, Tokyo (JP); C. I. TAKIRON CORPORATION, Osaka (JP); C. I. TAKIRONCIVIL CORPORATION, Osaka (JP)

( * ) Notice: Subject to any disclaimer, the term of this patent is extended or adjusted under 35 U.S.C. 154(b) by 0 days.

(21) Appl. No.: 18/273,343

(22) PCT Filed: Jan. 27, 2022

(86) PCT No.: PCT/JP2022/003117
§ 371 (c)(1),
(2) Date: Jul. 20, 2023

(87) PCT Pub. No.: WO2022/168730
PCT Pub. Date: Aug. 11, 2022

(65) Prior Publication Data
US 2024/0106390 A1 Mar. 28, 2024

(30) Foreign Application Priority Data
Feb. 2, 2021 (JP) ................................. 2021-015113

(51) Int. Cl.
H02S 40/22 (2014.01)
A01G 13/30 (2025.01)
H02S 20/30 (2014.01)

(52) U.S. Cl.
CPC .............. H02S 40/22 (2014.12); A01G 13/30 (2025.01); H02S 20/30 (2014.12)

(58) Field of Classification Search
CPC .......... H02S 20/10; H02S 20/30; H02S 40/20; H02S 40/22; A01G 13/0256; A01G 13/30;
(Continued)

(56) References Cited

U.S. PATENT DOCUMENTS 5,221,570 A * 6/1993 Gokcen ................... B32B 27/32
156/244.11
2013/0319521 A1 12/2013 Chida et al.
(Continued)

FOREIGN PATENT DOCUMENTS

CN 106888871 A * 6/2017
JP 8-103177 4/1996
(Continued)

OTHER PUBLICATIONS

KR-2198570-B1 English machine translation (Year: 2021).*
(Continued)

*Primary Examiner* — Andrew J Golden
(74) *Attorney, Agent, or Firm* — Greenblum & Bernstein, P.L.C.

(57) ABSTRACT

The present invention is provided with a plurality of solar power generation panels installed via trestles, where an upper surface of power generation surface of the panels faces the sunlight incidence direction. The solar power generation panels include double-sided incidence-type solar power generation panels provided with power generation
(Continued)

surfaces on both the upper and lower sides. A light passage space is provided below a lower surface of a power generation surface. The present invention includes a reflector laid so as to cover a site ground underneath the solar power generation panels and the periphery thereof. The reflector is provided with a reflecting layer including a sheet material with a highly light-reflective colour where the surface side facing the lower surface of power generation surface reflects directly incident light of sunlight and scattered light of sunlight.

18 Claims, 5 Drawing Sheets

(58) Field of Classification Search
CPC ........ A01G 13/33; A01G 9/20; A01G 9/1438; A01G 9/1407; B32B 27/18; B32B 27/32; B32B 2264/108
See application file for complete search history.

(56) References Cited

U.S. PATENT DOCUMENTS

| | | | |
|---|---|---|---|
| 2016/0262323 A1 | 9/2016 | Iwai | |
| 2020/0238675 A1* | 7/2020 | Cornellier | B32B 27/32 |

FOREIGN PATENT DOCUMENTS

| JP | 2002-182211 | | 6/2002 | | |
|---|---|---|---|---|---|
| JP | 2006325456 | A * | 12/2006 | | |
| JP | 2007-262861 | | 10/2007 | | |
| JP | 2012-134464 | | 7/2012 | | |
| JP | 2015-28241 | | 2/2015 | | |
| JP | 2015-42143 | | 3/2015 | | |
| JP | 2015-216766 | | 12/2015 | | |
| JP | 2015-228736 | | 12/2015 | | |
| JP | 2016-59280 | | 4/2016 | | |
| JP | 3219118 | | 11/2018 | | |
| JP | 2019-68795 | | 5/2019 | | |
| JP | 3221289 | | 5/2019 | | |
| KR | 2019121131 | A * | 10/2019 | ............. | D06N 20/10 |
| KR | 2019128539 | A * | 11/2019 | ............. | H02S 20/10 |
| KR | 10-2020-0005512 | | 1/2020 | | |
| KR | 2198570 | B1 * | 1/2021 | ............. | H02S 20/10 |

OTHER PUBLICATIONS

KR-2019128539-A English machine translation (Year: 2019).*
KR-2019121131-A English machine translation (Year: 2019).*
JP-2006325456-A English machine translation (Year: 2006).*
JP 3219118U English machine translation (Year: 2018).*
JP 2015/028241A English machine translation (Year: 2015).*
JP 3221289U English machine translation (Year: 2019).*
CN-106888871-A English machine translation (Year: 2017).*
International Search Report Issued in International Patent Application No. PCT/JP2022/003117, dated Mar. 8, 2022.

* cited by examiner

SOLAR POWER GENERATION SYSTEM AND REFLECTOR FOR SOLAR POWER GENERATION SYSTEM

TECHNICAL FIELD

The present invention relates to a solar power generation system and a reflector for solar power generation system.

BACKGROUND ART

As a solar power generation system, there is a conventional system such as the mega-solar in which a large number of solar power generation panels are arranged on the ground and large-scale power generation takes place.

As illustrated in the below-mentioned Patent Literature 1 and 2, this mega-solar has a large number of solar power generation panels installed at a very large site, where each solar power generation panel is arranged via a trestle in a state where the panels are respectively inclined at a predetermined angle.

Because such a solar power generation system configured of a large number of solar power generation panels are installed outside at a very large site, a great deal of labour is necessary for maintenance; namely, work such as suppressing the growth of weeds from the site ground under the solar power generation panels, for example, becomes necessary so as to not lead to a reduction of power generation efficiency.

CITATION LIST

Patent Literature

Patent Literature 1: JP 2015-228736 A
Patent Literature 2: JP 2015-216766 A
Patent Literature 3: JP 2019-068795 A

SUMMARY OF INVENTION

Technical Problem

The weeds growing from the site ground as mentioned above are a problem in that a defect occurs due to the advancing weed growth covering up the solar power generation panels; namely, the amount of incidence of sunlight to the power generation surface decreases by the blocking of sunlight. Moreover, the extermination of weeds to counteract this takes place by manual removal; namely, by the work of pulling out weeds and scattering herbicide. In other words, workers are required and thus there is a problem with the extermination of weeds in that such work requires a great deal of time. Moreover, because the weeds do not simply go away but keep re-growing, weed removing work must be repeatedly performed, hence the maintenance work is very complicated. Furthermore, there is concern that the usage of herbicide may also destroy the surrounding natural environment. Moreover, other methods have also taken place in order to reduce such work, such as covering a site ground with concrete after weed removal, or laying a weed barrier sheet onto the ground to inhibit weed growth. However, this is complicated construction work, and a reduction of expenses is demanded.

Meanwhile, the installation of a large number of solar power generation panels on a very large site is necessary to ensure sufficient power generation amount, and one section of a flat site ground is required in order to install a large-scale power generation facility having power generation output amount of 1 MW (1 megawatt=1000 kW) or more. Thus, it is sought to achieve, for example, an installation condition with a high power generation efficiency per site area. In order to improve such power generation efficiency, a reflective multi-sheet such as that of the aforementioned Patent Literature 3 is laid on the ground where this multi-sheet utilizes reflected light from the ground for generating power by using solar power generation panels also having a power generation function on the back surface. However, while weed overgrowth is suppressed by the above-mentioned countermeasure which is to merely make it difficult for sunlight to reach, the work of removing and pulling out weeds is inevitable, which requires maintenance cost and hence further improvement was desired. Moreover, because the site ground side of a reflective multi-sheet is configured of a resin film, the reflecting surface of the sheet becomes non-flat when installing this on a non-flat ground and thus reflectivity may be reduced, and the light incident to the back surface of the solar power generation panels may decrease. Furthermore, installation on a non-flat ground may also damage the sheet.

Taking into consideration the aforementioned situation, the objective of the present invention is to provide a solar power generation system and a reflector for solar power generation system which can improve power generation efficiency as well as reduce a site area, and which can increase the amount of power generation whilst reducing costs such as construction and maintenance costs. Moreover, the objective of the present invention is to provide a reflector for solar power generation system with excellent weather resistance.

Solution to Problem

Next, the means to solve the aforementioned problem will be explained with reference to the drawings corresponding to the embodiments.

The solar power generation system 1 according to claim 1 of the present invention is a solar power generation system provided with a plurality of solar power generation panels 2 installed via trestles 3 where an upper surface of power generation surface 6 is made to incline towards a sunlight incidence direction at a predetermined angle, characterised in that the solar power generation panels 2 comprise double-sided incidence-type solar power generation panels provided with power generation surfaces 6 and 12 on both the upper surface and a lower surface, the trestles 3 are set at a predetermined height and a light passage space 13 is provided below a lower surface of power generation surface 12 of the double-sided incidence-type solar power generation panels 2, the solar power generation system comprises a reflector 4 laid so as to cover a site ground 7 underneath the double-sided incidence-type solar power generation panels 2 and the periphery thereof, where said reflector 4 is provided with a reflecting layer 14 having a light-reflecting surface comprising a sheet material with a highly light reflective colour where a surface side facing a lower surface of power generation surface 12 of the double-sided incidence-type solar power generation panels 2 reflects directly incident light of sunlight and scattered light of sunlight towards the lower surface of power generation surface 12, and a weed barrier layer 15 comprising a weed barrier sheet material where a back surface side faces the site ground 7 and is in contact with said site ground 7, where said reflector 4 is integrally formed by lamination of the reflecting layer 14 and the weed barrier layer 15.

With this solar power generation system, configuring the solar power generation panels as double-sided incidence-type solar power generation panels 2 enables the power generation amount to be improved, and the power generation efficiency can also be improved because directly incident light of sunlight and scattered light of sunlight is made to reflect and be incident on the lower surface of power generation surface 12, with the reflector 4 comprising a highly light reflective sheet material. Moreover, providing the weed barrier layer 15 at the reflector 4 suppresses weed growth from the site ground, thereby reducing maintenance work as well as reducing the costs thereof.

The solar power generation system according to claim 2 of the present invention is the solar power generation system according to claim 1 characterised in that the colour of the light-reflecting surface is white.

With this solar power generation system, configuring the colour of the light-reflecting surface to be white can make the light, of the directly incident light of sunlight and scattered light of sunlight, in the wavelengths used in power generation be favourably incident as reflected light on the lower surface of power generation surface 12, and power generation efficiency can be made to improve.

The solar power generation system according to claim 3 of the present invention is the solar power generation system according to claim 1 characterised in that the light-reflecting surface is formed by a metallic layer.

With this solar power generation system, configuring the light-reflecting surface to be a metallic layer can make the directly incident light of sunlight and scattered light of sunlight be favourably incident as reflected light on the lower surface of the power generation surface 12, and power generation efficiency can be made to improve.

The solar power generation system according to claim 4 of the present invention is the solar power generation system according to any one of claims 1 to 3 characterised in that the light-reflecting surface has a light reflectivity of sunlight in a 500 to 1000 nm wavelength of 70% or more, and an average light reflectivity of sunlight in a 5000 to 20000 nm wavelength of 15% or less.

With this solar power generation system, the light of sunlight in the region from visible light to near infrared on the short wavelength side is made to be reflected, and the light reflectivity of the far infrared region side is low. Thus, a temperature rise of the solar power generation panels can be prevented, and there is no reduction in power generation efficiency.

The solar power generation system according to claim 5 of the present invention is the solar power generation system according to any one of claims 1 to 4 characterised in that a surface of a reflecting layer constituting the reflector 4 has a water shielding property, where the water shielding coefficient of said reflector 4 is $1.0 \times 10^{-11}$ m/sec or less.

With this solar power generation system, by providing a water shielding property on the reflecting layer surface of the reflector to be laid on the site ground, rainwater does not puddle on the surface of reflector 4, but leads towards the outside of the reflector. Thereby, it is difficult for the surface of reflecting layer 14 to become dirty, and maintenance frequency is suppressed.

The solar power generation system according to claim 6 of the present invention is the solar power generation system according to any one of claims 1 to 4 characterised in that the reflector 4 is provided with water permeability having a water-permeating coefficient of said reflector 4 of $1.0 \times 10^{-5}$ to 1.0 m/sec.

With this solar power generation system, providing water permeability on the reflector 4 to be laid on the site ground leads rainwater to pass through towards the site ground, so that the rainwater does not puddle on the surface of reflector 4. Thereby, there is no reduction in power generation efficiency.

The solar power generation system according to claim 7 of the present invention is the solar power generation system according to any one of claims 1 to 6 characterised by having a UV light deterioration preventing layer at a surface of said reflecting layer.

With this solar power generation system, the UV light deterioration preventing layer prevents the UV light deterioration of the reflecting layer; namely, prevents the deterioration by light irradiation of the UV light region included in sunlight, thus extending the life of reflector, and the exchange intervals and maintenance intervals can be extended.

The reflector 4 for solar power generation system according to claim 8 of the present invention is a reflector used in a solar power generation system provided with a plurality of double-sided incidence-type solar power generation panels 2 installed via trestles 3 wherein an upper surface of power generation surface 6 is made to incline towards the sunlight incidence direction at a predetermined angle, characterised in that said reflector 4 consists of a reflecting layer 14 having a light-reflecting surface comprising a sheet material with a highly light-reflective colour made to reflect directly incident light of sunlight and scattered light of sunlight towards a lower surface of power generation surface 12 of the solar power generation panels 2, and a weed barrier layer 15 comprising a weed barrier sheet material, where said reflector 4 is integrally formed by lamination of the reflecting layer 14 and the weed barrier layer 15, and the thickness of the reflector 4 is 1.0 mm or more.

With this reflector for solar power generation system, the power generation efficiency can be made to improve because directly incident light of sunlight and scattered light of sunlight is made to reflect and be incident on the lower surface of power generation surface 12 of the double-sided incidence-type solar power generation panels 2, with the reflector 4 comprising a highly light-reflective sheet material. Moreover, providing the weed barrier layer 15 at the reflector 4 suppresses weed growth from the site ground, thereby reducing maintenance work as well as reducing the costs thereof.

Furthermore, even if this reflector 4 is installed on a non-flat ground, the reflectivity is not reduced because the reflecting surface forms a flat or nearly flat gently sloping surface, hence there is no decrease in the light incident to the lower surface of power generation surface 12 of the solar power generation panels.

The reflector for solar power generation system according to claim 9 of the present invention is the reflector for solar power generation system according to claim 8 characterised in that the colour of the light-reflecting surface is white.

With this reflector for solar power generation system, configuring the colour of the light-reflecting surface to be white can make the light, of the directly incident light of sunlight and scattered light of sunlight, in the wavelengths used in power generation be favourably incident as reflected light on the lower surface of the power generation surface 12, and power generation efficiency can be made to improve.

The reflector for solar power generation system according to claim 10 of the present invention is the reflector for solar power generation system according to claim 8 characterised in that the light-reflecting surface is formed by a metallic layer.

With this reflector for solar power generation system, configuring the light-reflecting surface to be a metallic layer can make the directly incident light of sunlight and scattered light of sunlight be favourably incident as reflected light on the lower surface of the power generation surface 12, and power generation efficiency can be made to improve.

The reflector for solar power generation system according to claim 11 of the present invention is the reflector for solar power generation system according to any one of claims 8 to 10 characterised in that the light-reflecting surface has a light reflectivity of sunlight in a 500 to 1000 nm wavelength of 70% or more, and an average light reflectivity of sunlight in a 5000 to 20000 nm wavelength of 15% or less.

With this reflector for solar power generation system, the light of sunlight in the region from visible light to near infrared on the short wavelength side is made to be reflected, and the light reflectivity of the far infrared region side is low. Thus, a temperature rise of the solar power generation panels can be prevented, and there is no reduction in power generation efficiency.

The reflector for solar power generation system according to claim 12 of the present invention is the reflector for solar power generation system according to any one of claims 8 to 11 characterised in that a surface of a reflecting layer constituting the reflector 4 has a water shielding property, where the water shielding coefficient of said reflector 4 is 1.0×10−11 m/sec or less.

With this reflector for solar power generation system, by providing a water shielding property on the reflecting layer surface of the reflector to be laid on the site ground, rainwater does not puddle on the surface of reflector 4, but leads towards the outside of the reflector. Thereby, it is difficult for the surface of reflecting layer 14 to become dirty, and maintenance frequency is suppressed.

The reflector for solar power generation system according to claim 13 of the present invention is the reflector for solar power generation system according to any one of claims 8 to 11 characterised in that the reflector 4 is provided with water permeability having a water-permeating coefficient of said reflector 4 of $1.0 \times 10^{-5}$ to 1.0 m/sec.

With this reflector for solar power generation system, providing water permeability on the reflector 4 to be laid on the site ground leads rainwater to pass through towards the site ground, so that the rainwater does not puddle on the surface of reflector 4. Thereby, there is no reduction in power generation efficiency.

The reflector for solar power generation system according to claim 14 of the present invention is the reflector for solar power generation system according to any one of claims 8 to 13 characterised by having a UV light deterioration preventing layer at a surface of said reflecting layer.

With this reflector for solar power generation system, the UV light deterioration preventing layer prevents the UV light deterioration of the reflecting layer; namely, prevents the deterioration by light irradiation of the UV light region included in sunlight, thus extending the life of the reflector, and the exchange intervals and maintenance intervals can be extended.

The reflector for solar power generation system according to claim 15 of the present invention is the reflector for solar power generation system according to claim 9 characterised in that the reflecting layer consists of a thermoplastic resin and a white pigment.

With this reflector for solar power generation system, configuring the colour of the light-reflecting layer to be white can make the light, of the directly incident light of sunlight and scattered light of sunlight, in the wavelengths used in power generation be favourably incident as reflected light on the lower surface of the power generation surface, and power generation efficiency can be made to improve.

Moreover, because the reflecting surface of the sheet is flat, even if it is installed on a non-flat ground, the reflectivity is not reduced and there is no decrease in the light incident to the back surface of the solar power generation panels.

The reflector for solar power generation system according to claim 16 of the present invention is the reflector for solar power generation system according to claim 15 characterised in that the thermoplastic resin consists of an olefin-based resin.

With this reflector for solar power generation system, the reflecting layer is configured to have superior in mechanical strength.

The reflector for solar power generation system according to claim 17 of the present invention is the reflector for solar power generation system according to claim 16 characterised in that the olefin-based resin consists of at least one kind of low density polyethylene and linear low density polyethylene.

With this reflector for solar power generation system, the reflecting layer can be configured to have superior flexibility and workability amongst ethylene-based resin sheets.

The reflector for solar power generation system according to claim 18 of the present invention is the reflector for solar power generation system according to claim 9 characterised in that the weed barrier layer consists of a thermoplastic resin and a black pigment.

With this reflector for solar power generation system, by configuring the weed barrier layer to be a black sheet body, the density can be larger than that of a non-woven fabric, and the weight stress per volume can be efficiently imparted to the weeds to promote the withering and death of the weeds.

The reflector for solar power generation system according to claim 19 of the present invention is the reflector for solar power generation system according to claim 18 characterised in that the thermoplastic resin consists of an olefin-based resin.

With this reflector for solar power generation system, the weed barrier layer is configured to have superior mechanical strength.

The reflector for solar power generation system according to claim 20 of the present invention is the reflector for solar power generation system according to claim 19 characterised in that the olefin-based resin consists of at least one kind of low density polyethylene and linear low density polyethylene.

With this reflector for solar power generation system, the weed barrier layer can be configured to have superior flexibility and workability amongst ethylene-based resin sheets.

Advantageous Effects of Invention

There is an effect in the solar power generation system according to claim 1 of the present invention in that the power generation efficiency can be improved and the power generation amount can also be improved, because directly incident light of sunlight and scattered light of sunlight are made to reflect and become incident on the lower surface of the power generation surface of the double-sided incidence-type solar power generation panels, with the reflector comprising a highly light-reflective sheet material. Moreover, by improving the power generation amount, the number of solar power generation panels installed can be reduced, which can promote site ground reduction.

Moreover, the reflector being provided with a weed barrier layer in contact with the site ground suppresses weed growth from the site ground, and thereby maintenance work such as pulling out weeds, as well as the costs thereof can be reduced.

In the solar power generation system according to claim 2 of the present invention, configuring the colour of the light-reflecting surface to be white can make the light, of the directly incident light of sunlight and scattered light of sunlight, in the wavelengths used in power generation be favourably incident as reflected light on the lower surface of the power generation surface, and power generation efficiency can be made to improve.

In the solar power generation system according to claim 3 of the present invention, configuring a light-reflecting surface to be a metallic layer can make directly incident light of sunlight and scattered light of sunlight be favourably incident as reflected light on the lower surface of the power generation surface, and power generation efficiency can be made to improve.

An effect of the solar power generation system according to claim 4 of the present invention is obtainable in that the light of sunlight in the region from visible light to near infrared on the short wavelength side is made to be reflected, and the light reflectivity of the far infrared region side is low. Thus, a temperature rise of the solar power generation panels can be prevented, and there is no reduction in power generation efficiency.

In the solar power generation system according to claim 5 of the present invention, by providing a water shielding property on the surface of the reflector, rainwater does not puddle on the surface of the reflector, but can lead towards the outside of the reflector, and thereby it is difficult for the surface of the reflecting layer to become dirty, which can suppress the maintenance frequency.

An effect of the solar power generation system according to claim 6 of the present invention is obtainable in that providing water permeability on the reflector to be laid on the site ground leads rainwater to pass through towards the site ground, so that the rainwater does not puddle on the surface of the reflector. Thereby, there is no reduction in power generation efficiency.

In the solar power generation system according to claim 7 of the present invention, the UV light deterioration preventing layer prevents the UV light deterioration of the reflecting layer; namely, prevents the deterioration by light irradiation of UV light region included in sunlight, and thus the life of the reflector can be extended and the exchange intervals and maintenance intervals can be extended.

There is an effect in the reflector for solar power generation system according to claim 8 of the present invention in that the power generation efficiency can be improved and the power generation amount can also be improved, because directly incident light of sunlight and scattered light of sunlight are made to reflect and become incident on the lower surface of the power generation surface of the double-sided incidence-type solar power generation panels, with the reflector comprising a highly light-reflective sheet material. Moreover, by improving the power generation amount, the number of solar power generation panels installed can be reduced, thus site ground reduction can be promoted.

Moreover, the reflector being provided with a weed barrier layer in contact with the site ground suppresses weed growth from the site ground, and thereby maintenance work such as pulling out weeds, as well as the costs thereof can be reduced.

Furthermore, even if this reflector is installed on a non-flat ground, the reflectivity is not reduced because the reflecting surface forms a flat or nearly flat gently sloping surface, hence there is no decrease in the light incident to the lower surface of the power generation surface of the solar power generation panels.

In the reflector for solar power generation system according to claim 9 of the present invention, configuring the colour of the light-reflecting surface to be white can make the light, of the directly incident light of sunlight and scattered light of sunlight, in the wavelengths used in power generation be favourably incident as reflected light on the lower surface of the power generation surface, and power generation efficiency can be made to improve.

In the reflector for solar power generation system according to claim 10 of the present invention, configuring the light-reflecting surface to be a metallic layer can make directly incident light of sunlight and scattered light of sunlight be favourably incident as reflected light on the lower surface of the power generation surface, and power generation efficiency can be made to improve.

An effect of the reflector for solar power generation system according to claim 11 of the present invention is obtainable in that the light of sunlight in the region from visible light to near infrared on the short wavelength side is made to be reflected, and the light reflectivity of the far infrared region side is low. Thus, a temperature rise of the solar power generation panels can be prevented, and there is no reduction in power generation efficiency.

In the reflector for solar power generation system according to claim 12 of the present invention, by providing a water shielding property on the surface of the reflector, rainwater does not puddle on the surface of the reflector, but can lead towards the outside of the reflector, and thereby it is difficult for the surface of the reflecting layer to become dirty, which can suppress the maintenance frequency.

An effect of the reflector for solar power generation system according to claim 13 of the present invention is obtainable in that providing water permeability on the reflector to be laid on the site ground leads rainwater to pass through towards the site ground, so that the rainwater does not puddle on the surface of the reflector. Thereby, there is no reduction in power generation efficiency.

In the reflector for solar power generation system according to claim 14 of the present invention, the UV light deterioration preventing layer prevents the UV light deterioration of the reflecting layer; namely, prevents the deterioration by light irradiation of the UV light region included in sunlight, and thus the life of the reflector can be extended and the exchange intervals and maintenance intervals can be extended.

In the reflector for solar power generation system according to claim 15 of the present invention, configuring the colour of the light-reflecting layer to be white can make the light, of the directly incident light of sunlight and scattered light of sunlight, in the wavelengths used in power generation be favourably incident as reflected light on the lower surface of the power generation surface, and power generation efficiency can be made to improve.

In the reflector for solar power generation system according to claim 16 of the present invention, the reflecting layer is configured to have superior mechanical strength.

In the reflector for solar power generation system according to claim 17 of the present invention, the reflecting layer can be configured to have superior flexibility and workability amongst ethylene-based resin sheets.

In the reflector for solar power generation system according to claim 18 of the present invention, by configuring the weed barrier layer to be a black sheet body, the density can be larger than that of a non-woven fabric, and the weight stress per volume can be efficiently imparted to the weeds to promote the withering and death of the weeds.

In the reflector for solar power generation system according to claim 19 of the present invention, the weed barrier layer is configured to have superior mechanical strength.

In the reflector for solar power generation system according to claim 20 of the present invention, the weed barrier layer can be configured to have superior flexibility and workability amongst ethylene-based resin sheets.

DESCRIPTION OF EMBODIMENTS

The first embodiment according to the present invention will be explained below with reference to the drawings.

Figure 1:
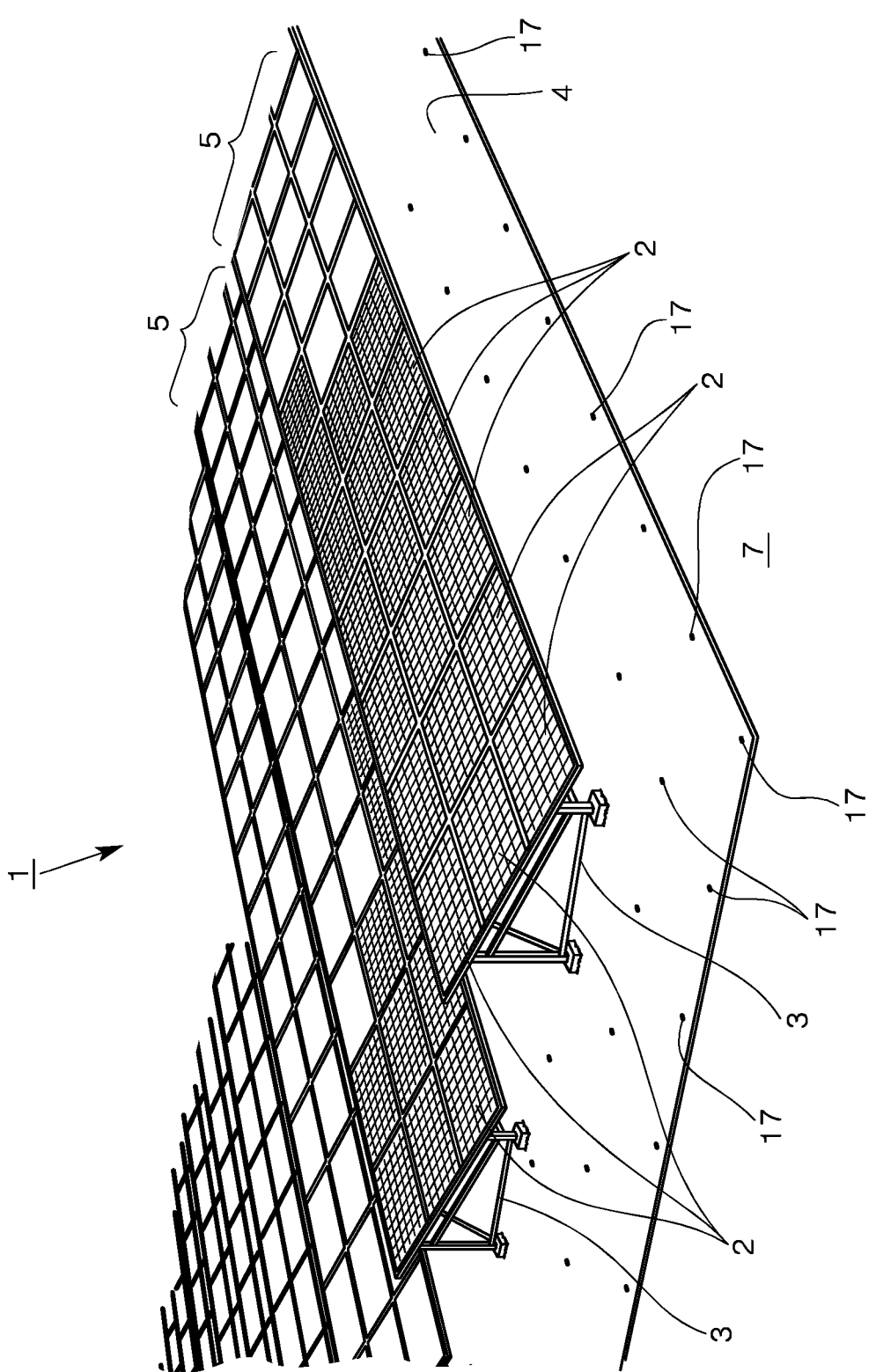
FIG. 1 is a schematic perspective view of a solar power generation system according to the first embodiment of the present invention.

FIG. 1 is a perspective view illustrating the schematic of a solar power generation system according to an embodiment of the present invention.

The solar power generation system 1 according to the present embodiment has solar power generation panels 2, trestles 3 and a reflector 4 as the main constituents.

The solar power generation panels 2 are configured of an integrated and modularised plurality of solar cells, where the solar cells are provided at both the front and back surfaces in the present embodiment, and the solar power generation panels 2 comprise double-sided incidence-type solar power generation panels where power generation surfaces are formed on both sides.

As illustrated in FIG. 1, a plurality of solar power generation panels 2 are vertically and horizontally arranged in parallel and connected elongate in the horizontal direction, and are mounted to the below-described trestles 3 to constitute solar cell arrays 5, where these solar cell arrays 5 are arranged in multiple rows in the depth direction on a site of desired width. These solar cell array rows constitute a so-called mega-solar (large-scale solar power generation); namely, these rows form a group of solar power generation panels of which an output of at least 1 MW or more is obtainable.

Each of the solar cell arrays 5 is arranged in intervals with predetermined spacing. This spacing is configured so that the upper surfaces of power generation surface 6 of each solar cell array 5 of the solar power generation panels 2 installed in multiple rows do not cast shadows of directly incident light of sunlight on each other, and so that workers can sufficiently go through this spacing when performing maintenance and the like.

There are a variety of configurations for the solar power generation panels 2, where suitably utilized are, e.g., the Swan series manufactured by Jinko Solar, MBB double-sided PERC Half Cell Double Glass Module manufactured by JA Solar, Duomax Twin manufactured by Trina Solar, HiKu5 series manufactured by Canadian Solar, LR4-72HBD series manufactured by Longi Solar, Q.PEAK DUO manufactured by Hanwha Q Cells, Double Glass Double Side Power Generation Single Crystal PERC Module manufactured by Risen Energy Inc, and GCL-M6/72GD manufactured by Golden Concord Holdings Limited(GCL), where the power generation amount per any one panel increases by about 20% due to power generation by the lower surface of the power generation surface 12 which is the back surface.

Figure 3:
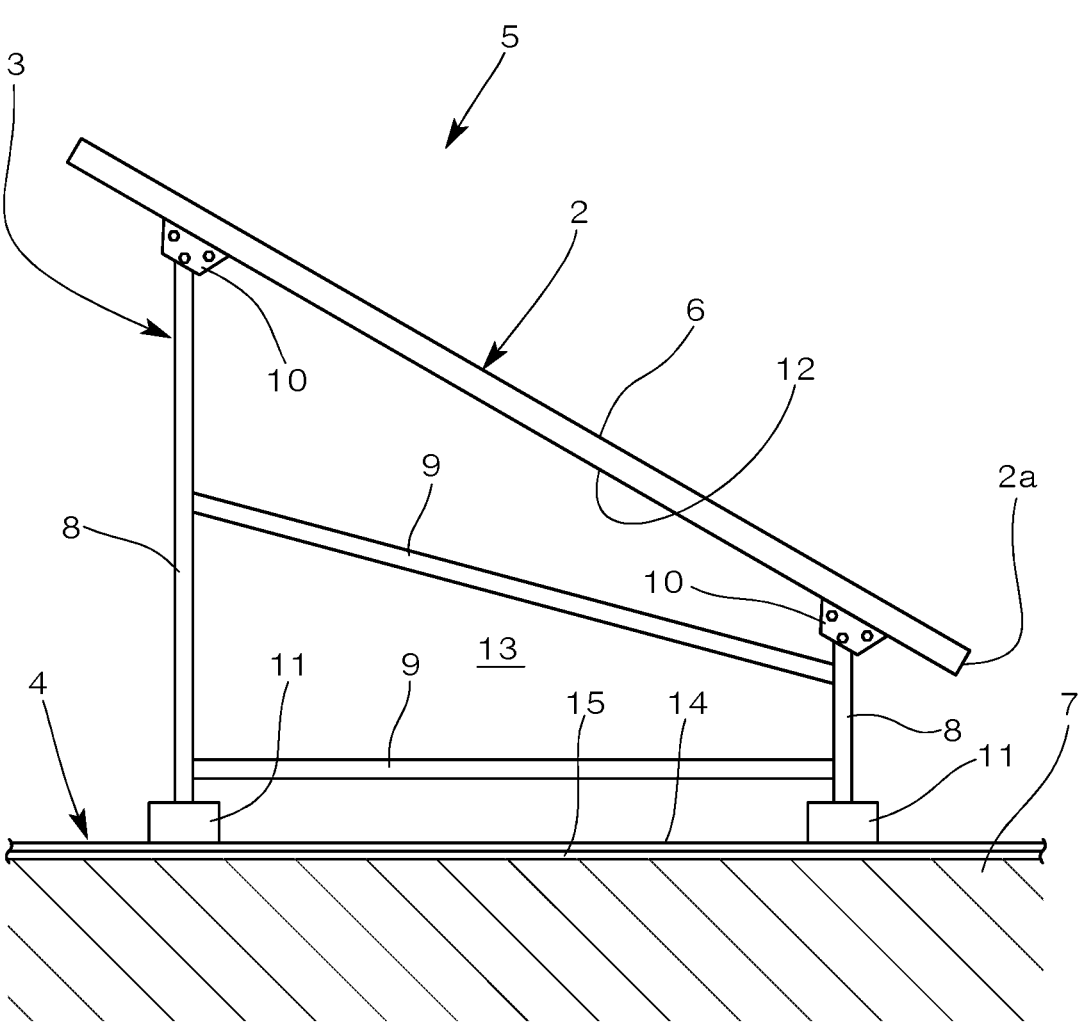
FIG. 3 is a partially enlarged side view of a solar power generation system.

FIG. 3 is a partially enlarged side view of a solar power generation system.

Solar cell arrays 5 are configured of the aforementioned solar power generation panels 2, and trestles 3 on which these solar power generation panels 2 are mounted, where the solar cell arrays 5 are installed on site ground 7.

Trestles 3 are configured of support pillars 8, horizontal suspension members 9, connecting brackets 10 etc., which are respectively connected and fixed by means of bolts, welding and the like. Moreover, the trestles 3 are fixed by foundations 11 installed on ground 7.

On the trestles 3, the solar power generation panels 2 are fixed by connecting brackets 10, and a power generation surface of the solar power generation panels 2 is provided at an incline, e.g. about 30° from the horizontal. This inclination angle is considered and determined by conditions such as the latitude and environment of the installation location, and for a high latitude region of the northern hemisphere such as Japan, for example, the upper surface of power generation surface 6 is inclined towards the south and fixed on the trestles 3.

The height of the trestles 3 is set so the height from site ground 7 until lower edge 2a of inclined panels 2 is 0.8 m or higher, which ensures sufficient space underneath the trestles 3. This space forms a light passage space 13 for the lower surface of the power generation surface 12 of solar power generation panels 2.

The reflector 4 faces the lower surface of the power generation surface 12 of the solar power generation panels 2 and is installed on site ground 7 underneath the trestles 3.

The reflector 4 is sheet-like, and is configured of a reflecting layer 14 which forms the upper surface and a weed barrier layer 15 which forms the lower surface, where each of these layers constitutes an integrated laminate.

In the first embodiment, the surface of the reflecting layer 14 constituting the reflector 4 has a water shielding property.

The reflecting layer 14 comprises a sheet material with a highly light-reflective colour made to reflect the light, of the directly incident light of sunlight and scattered light of sunlight, in the wavelengths used in power generation. In the present embodiment, the reflecting sheet is configured of a white-coloured surface. This reflecting sheet comprises a flexible material such as a resin sheet or rubber sheet having a thickness of 0.5 to 3.0 mm, and preferably 1.0 mm or 1.5 mm, where the resin sheet material is made of, for example, polyethylene resin, polyester resin, polypropylene resin, polyethylene terephthalate, vinyl chloride resin, polystyrene resin, fluorine resin, and nylon resin. Moreover, the surface is white, where the material of the reflecting sheet per se is white, or the surface is made from a white coating film etc.

This reflecting sheet which is provided with a water shielding property has a water shielding coefficient of $1.0 \times 10^{-11}$ m/sec or less, which can favourably lead rainwater and water drops from the surface towards the outside. The term 'water shielding coefficient' in relation to this is the 'water-permeating coefficient' in the voluntary industry standards of water shielding sheets as stipulated by Japan Lining Systems and Technologies Association (JLSTA). However, because of potential confusion with the water-permeating coefficient described below, the term 'water shielding coefficient' will be described in the present invention. After the water vapour transmission rate was obtained in accordance with the JIS Z 0208 'Testing Methods for Determination of the Water Vapour Transmission Rate of Moisture-Proof Packaging Materials (Dish Method)', this water shielding coefficient was obtained by the calculation method described in '6.4.8 Calculation of water-permeating coefficient' of the 'Water shielding engineering technique and management manual' (issued by JLSTA: May 2019 edition), and it was understood that the water permeability according to the aforementioned numerical value was low; namely, that a water shielding property was high.

The surface of the reflecting sheet is preferably provided with water repellence, and by having water-repellence, rainwater is repelled and water drops become easy to lead away from the reflecting sheet surface to the outside. Moreover, the reflecting sheet preferably has functions such as chemical resistance, heat resistance, fire and flame resistance, flame retardancy, cold resistance, radiation resistance, heat conductivity, abrasion, friction, and static electricity prevention. Furthermore, a transparent protective layer may be provided on the surface. The configuration which provides water-repellence on the surface of the reflecting sheet is as follows. For example, there is a first method of containing a water repelling agent in the reflecting sheet, and there is a second method of coating a surface treatment agent consisting of a water repelling agent onto the surface of the reflecting sheet.

In relation to this, regarding the issue of the aforementioned reflecting sheet surface being a highly light-reflective white colour, more specifically, although the power generation surface of solar power generation panels 2 generates power by being irradiated with sunlight, the entire wavelength range of sunlight does not need to be received onto this power generation surface, and the infrared range is not needed. Meanwhile, sunlight of the infrared range incurs an exothermic phenomenon on the solar power generation panels 2, where the power generation surface exceeding 50° C. causes the power generation efficiency to become reduced.

Therefore, the light of sunlight in the region from visible light to near infrared on the short wavelength side is preferably made to be reflected on the surface of the reflecting sheet, where for example, the colour of a reflecting sheet surface is configured to be white and an infrared removing film is provided on the surface thereof, and where for example, a film such as a filter is provided to remove or absorb near infrared and far infrared in the region 1000 nm or more, thus configuring the light of the infrared region to not reflect towards the solar power generation panels 2.

Moreover, because the reflecting sheet easily deteriorates due to the UV light contained in sunlight, the reflecting sheet may be provided with a UV light deterioration preventing layer by mixing a UV light absorbing agent in the surface layer of the reflecting sheet, and may be coated to prevent UV light deterioration.

Suitable as the aforementioned reflecting sheet is, e.g., a sheet provided with characteristics of the light reflectivity of sunlight in a 500 to 1000 nm wavelength being 70% or more, the light reflectivity of a wavelength of 2300 nm or more being low, as well as the average light reflectivity of sunlight in a 5000 to 20000 nm wavelength being 15% or less, preferably, the average light reflectivity of a wavelength of 5000 to 20000 nm is lower at 10% or less, where light of the so-called short-to-mid wavelength infrared, as well as long-wavelength infrared (heat infrared) and far infrared bands are not reflected. Moreover, suitable reflecting sheets may be configured to have, e.g., a white-coloured reflecting sheet surface and to be provided with an infrared removing film on the surface thereof, and may preferably be provided with a film such as a filter to remove or absorb near infrared and far infrared in the region of 1000 nm or more, where light of the infrared region is not reflected towards the solar power generation panels 2.

Suitably utilised as a specific reflecting sheet is, e.g., Vynon Metallo Barrier SLS (trade name) manufactured by C.I. TAKIRON Corporation, constituting an olefin-based resin consisting of a white layer having a white pigment on the surface, and a black layer having a black pigment on the back surface. In this case, the reflecting sheet per se also has a light-shielding rate of about 99%, hence a weed barrier effect can also be expected.

Experimental results of spectral reflection measurement by a Fourier transform infrared spectrophotometer (FTIR) in accordance with JIS R 1693-2: 2012 on this reflecting sheet (Vynon Metallo Barrier SLS (trade name)) are illustrated below.

EXPERIMENTAL APPARATUSES

FTIR apparatus (System 2000 model manufactured by Perkin Elmer)
Integrating sphere: (RSA-PE-200-ID manufactured by Labsphere), interior sphere portion coated with gold
Integrating sphere incidence diameter: φ16 mm
Measurement portion diameter: φ24 mm
[Measurement Conditions]
Measurement region: 370 to 7800 cm$^{-1}$ (effective range 400 to 6000 cm$^{-1}$)
Cumulative number of measurements: 200
Light source: MIR
Detector MIR-TGS
Resolution: 16 cm$^{-1}$
Beam splitter: optimized KBr Optical path from light source to detector was filled with N$_2$ gas and purged.

[Conditions]

Reflecting spectrum was measured at room temperature. Measurement took place utilizing an integrating sphere. These measurements were performed in accordance with JIS R 1693-2: 2012.

[Measurement Results]

Figure 5:
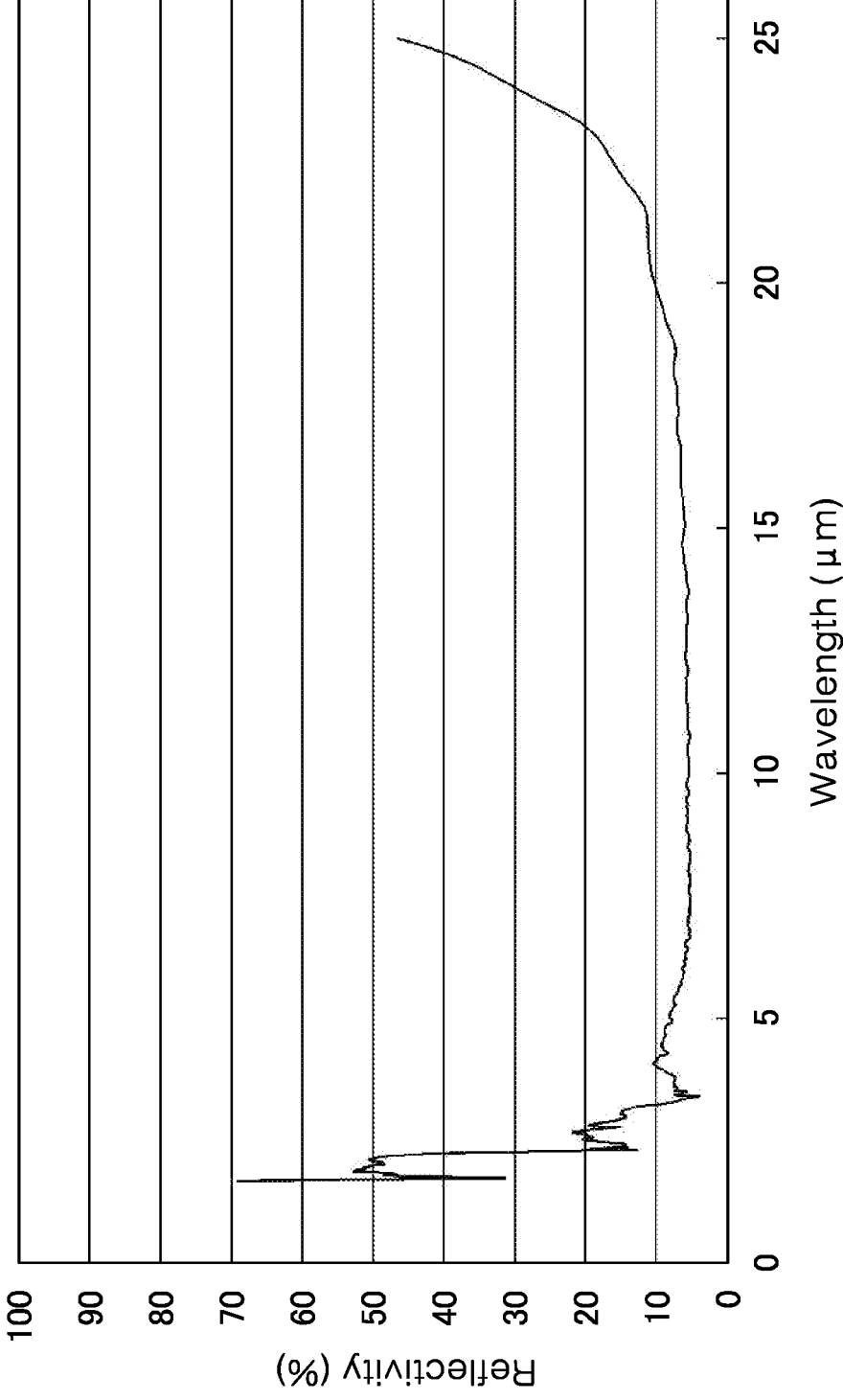
FIG. 5 is a graph illustrating the relationship between wavelength and light reflectivity in one example of the reflecting sheet, which is an experimental result of spectral reflection measurement.

The graph of FIG. 5 illustrates the spectral reflection spectrum at room temperature as the relationship between wavelength and light reflectivity. Characteristics are understood from the illustration in this FIG. 5 that the average light reflectivity of a wavelength of 5000 to 20000 nm is low at 10% or less, and that light of the so-called short-to-mid wavelength infrared, as well as long-wavelength infrared (heat infrared) and far infrared bands are not reflected.

The weed barrier layer 15 comprises a highly light-shielding weed barrier sheet, where a non-woven fabric is utilized, for example.

The weed barrier sheet which forms this weed barrier layer 15 is a sheet material which imparts environmental stress to the weeds such as heat stress, weight stress and stress due to photosynthesis inhibition, to promote the withering and death of the weeds.

As specific materials, such weed barrier sheet can be made of a long fibre non-woven fabric such as polyester fibre, or materials such as polyethylene fibre, polyamide fibre, aramid fibre, acrylic fibre, carbon fibre, polyurethane fibre, cotton yarn, wool yarn, silk yarn, linen or wool, where these can be made of a single material or formed by combining two or more materials. Moreover, a resin sheet having no water permeability may also be used in the weed barrier sheet. If reflector 4 is installed on a non-flat ground, it is more preferable to use a woven fabric or non-woven fabric with high cushioning so that the reflecting layer 14 is not damaged by the roughness of the ground.

The aforementioned weed barrier sheet is, e.g., a non-woven fabric preferably having a light transmittance of 10% or less for each wavelength measured per every 1 nm in a wavelength range of 400 nm or more and 700 nm or less, a puncture resistance of 10 to 30 N, and a basis weight of 100 to 400 g/m$^2$.

The resin sheet having no water permeability comprises a flexible material such as resin sheet or rubber sheet having a thickness of 0.5 to 3.0 mm, and preferably 1.0 mm or 1.5 mm. The resin sheet material may be made of, e.g., polyethylene resin, polyester resin, polypropylene resin, polyethylene terephthalate, vinyl chloride resin, polystyrene resin, fluorine resin or nylon resin.

As the specific weed barrier sheet, the following three examples can be mentioned as non-woven fabrics, for example.

Example 1

Suitably utilized, for example, is the AXTAR Mantle weed barrier sheet (trade name) manufactured by Toray Industries, Inc., the sheet having the data characteristics of: mass per unit area of 150 to 260 g/m$^2$, thickness of 0.4 to 0.6 mm, density of 0.4 g/cm$^3$, tensile strength in the vertical direction of 290 to 790 N/5 cm, tensile strength in the horizontal direction of 190 to 500 N/5 cm, elongation in the vertical direction of 15 to 30%, elongation in the horizontal direction of 15 to 25%, tear strength in the vertical direction of 80 N, tear strength in the horizontal direction of 100 N, water-permeating coefficient of 8.0×10$^{-5}$ to 1.0×10$^{-4}$ m/sec, puncture resistance of 17 to 20 N, and light-shielding rate of 95%.

Example 2

Moreover, this weed barrier sheet generally has a light-shielding rate, which is the capability of blocking sunlight, of 95% or more. Suitably used, for example, is 9321N (trade name) manufactured by Toyobo Co Ltd, which comprises a non-woven fabric having the characteristics of: weight of about 310 g/m$^2$, thickness of about 3.8 mm during 0.7 kPa of pressing, thickness of about 3.5 mm during 2 kPa of pressing, tensile strength in the vertical direction of about 1200 N/5 cm, tensile strength in the latitudinal direction of about 920 N/5 cm, elongation rate in the vertical direction of about 70%, elongation rate in the horizontal direction of about 80%, tear strength in the vertical direction of about 250 N, tear strength in the horizontal direction of about 240 N, water-permeating coefficient in 15° C. water temperature of 4.4×10$^{-3}$ m/sec, and bursting strength of about 3200 kPa.

Example 3

A preferable weed barrier sheet has a fabric weight of 2 kg/m$^2$ or more in order to impart weight stress on the weeds, has a light transmittance of 10% or less for each wavelength measured per every 1 nm in a wavelength range of 400 nm or more and 800 nm or less to absorb sunlight and suppress photosynthesis of the weeds under the weed barrier sheet, and to absorb sunlight to raise the temperature of the weed barrier sheet per se in order to impart heat stress on the weeds under the weed barrier sheet.

Moreover, a reflecting sheet being the reflecting layer 14 on the surface, and a weed barrier sheet being the weed barrier layer 15 as the back surface are integrated to obtain the sheet-like reflector 4 as a laminated structure.

The integration of the reflecting sheet and weed barrier sheet is performed by a method such as employing an extrusion moulding apparatus to obtain the reflector 4 by a process of co-extrusion moulding both sheets so as to form a two-layer single body, or by a method such as employing a laminating apparatus to laminate and integrate the reflecting sheet and weed barrier sheet with heat lamination. Furthermore, the reflector 4 may also be formed by a method of thermocompression bonding the reflecting sheet and weed barrier sheet with a heat press apparatus, or integrating the reflecting sheet and weed barrier sheet by bonding the entire surfaces thereof using an adhesive etc., or pasting these together with points or lines of adhesive etc.

This sheet-like reflector 4 is formed, for example, in a width of 1.0 to 2.5 m, length of 10 to 100 m and is manufactured, stored and then transported in a rolled state etc. Moreover, when laying the reflector 4, by unwinding it from the rolled state, deploying it on the site ground 7, laying a plurality of reflectors 4 in parallel in the width direction, and connecting and fixing these to each other, the site ground 7 will be covered so as to have no gaps.

Next, the second embodiment according to the present invention is explained with reference to FIG. 2.

Figure 2:
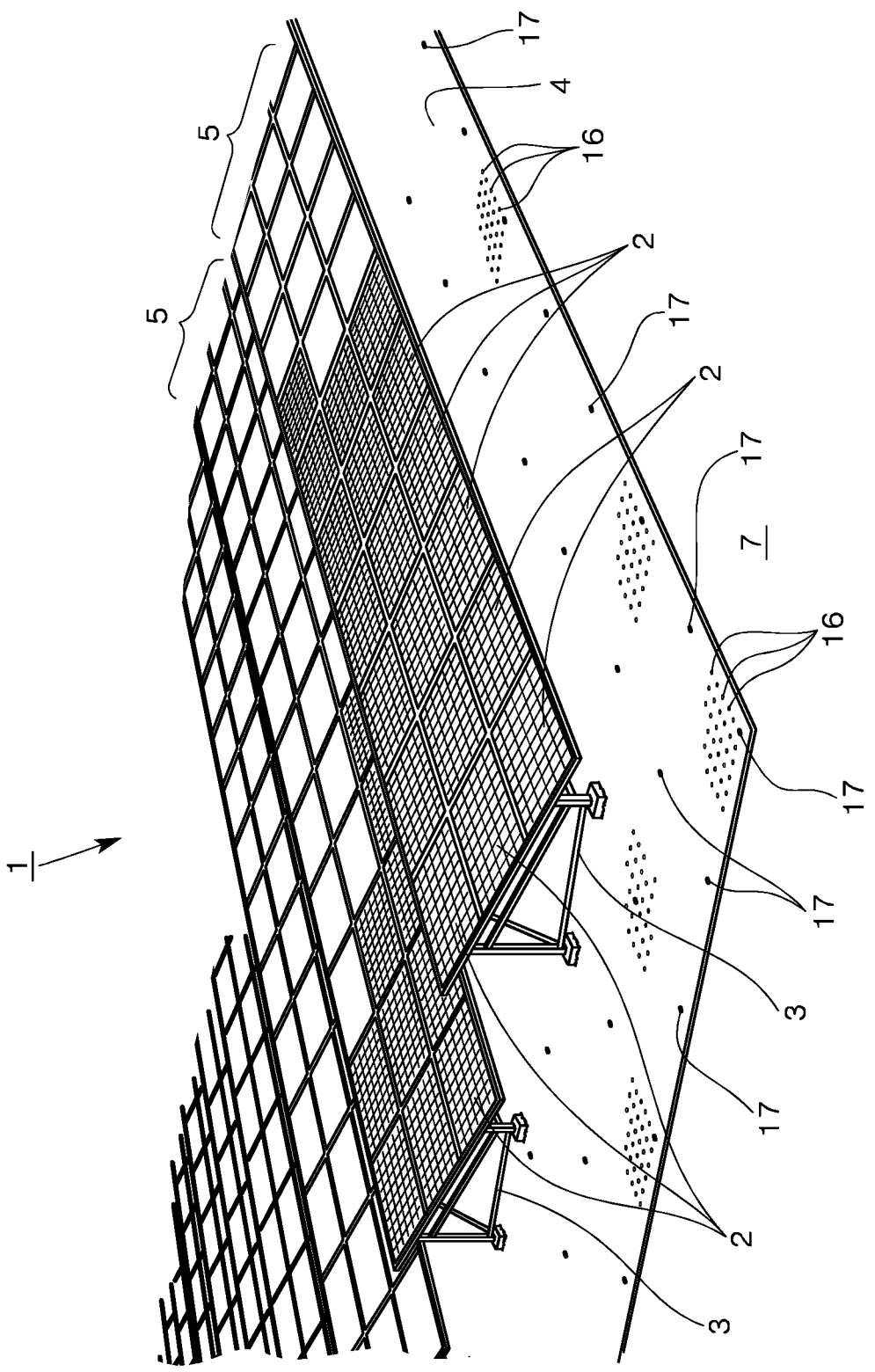
FIG. 2 is a schematic perspective view of a solar power generation system according to the second embodiment of the present invention.

FIG. 2 is a schematic perspective view of a solar power generation system according to the second embodiment of the present invention.

In the second embodiment, the same solar power generation panels 2 and trestles 3 as those of the first embodiment may be utilized.

In the second embodiment, the reflecting layer 14 constituting the reflector 4 has water permeability.

The reflecting layer 14 having water permeability enables rainwater to quickly permeate into the site ground. A configuration in which a large number of perforated portions 16 are formed penetrating through a woven fabric or nonwoven fabric, or a resin sheet or rubber sheet having a water shielding property, is used in the reflecting sheet having such water permeance function. By forming perforated portions 16, the reflecting sheet becomes a structure having water permeability in the thickness direction thereof. The perforated portions 16 are made of through-holes comprising inner diameters with good water flowability, where these portions are formed on some of the surface or on the entire surface.

The reflecting layer 14 comprises a sheet material with a highly light-reflective colour made to reflect the light, of the directly incident light of sunlight and scattered light of sunlight, in the wavelengths used in power generation.

As specific non-woven fabric materials, the reflecting layer 14 can be made of a long fibre non-woven fabric such as polyester fibre, or materials such as polyethylene fibre, polyamide fibre, aramid fibre, acrylic fibre, carbon fibre, polyurethane fibre, cotton yarn, wool yarn, silk yarn, linen or wool, where these can be made of a single material or formed by combining two or more materials.

Moreover, preferable are those with a light transmittance of 10% or less for each wavelength measured per every 1 nm in a wavelength range of 400 nm or more and 700 nm or less, a puncture resistance of 10 to 30 N, and a basis weight of 100 to 400 g/m$^2$.

The sheet comprising the aforementioned perforated portions 16 and having a water shielding property comprises a flexible material such as a resin sheet or rubber sheet having a thickness of 0.5 to 3.0 mm, and preferably 1.0 mm or 1.5 mm. The resin sheet material is made of, for example, polyethylene resin, polyester resin, polypropylene resin, polyethylene terephthalate, vinyl chloride resin, polystyrene resin, fluorine resin, nylon resin, etc.

As the weed barrier layer 15, a highly light-shielding weed barrier sheet is preferably utilized. For example, a non-woven fabric is utilized.

As specific materials, the weed barrier layer 15 can be made of a long fibre non-woven fabric such as polyester fibre, or materials such as polyethylene fibre, polyamide fibre, aramid fibre, acrylic fibre, carbon fibre, polyurethane fibre, cotton yarn, wool yarn, silk yarn, linen or wool, where these can be made of a single material or formed by combining two or more materials.

In addition to a non-woven fabric, an embossed-type three-dimensional structural sheet or a three-dimensional mesh-like body such as a net can also be integrated with a non-woven fabric and used as a water-draining core material. In order to obtain a sufficient weed barrier effect, at least one layer constituting a weed barrier layer for the light-shielding property is preferably configured of a dark colour such as black. Ultimately, if the light-shielding property of the reflecting layer is sufficient, it is not necessary for the weed barrier sheet to have a light-shielding property.

As the specific weed barrier sheet, the following three examples can be mentioned as non-woven fabrics, for example.

Example 1

Suitably utilized, for example, is the AXTAR Mantle weed barrier sheet (trade name) manufactured by Toray Industries, Inc., the sheet having the data characteristics of: mass per unit area of 150 to 260 g/m$^2$, thickness of 0.4 to 0.6 mm, density of 0.4 g/cm$^3$, tensile strength in the vertical direction of 290 to 790 N/5 cm, tensile strength in the horizontal direction of 190 to 500 N/5 cm, elongation in the vertical direction of 15 to 30%, elongation in the horizontal direction of 15 to 25%, tear strength in the vertical direction of 80 N, tear strength in the horizontal direction of 100 N, water-permeating coefficient of $8.0 \times 10^{-5}$ to $1.0 \times 10^{-4}$ m/sec, puncture resistance of 17 to 20 N, and light-shielding rate of 95%.

Example 2

Moreover, this weed barrier sheet generally has a light-shielding rate, which is the capability of blocking sunlight, of 95% or more. Suitably used, for example, is 9321N (trade name) manufactured by Toyobo Co Ltd, which comprises a non-woven fabric having the characteristics of: weight of about 310 g/m$^2$, thickness of about 3.8 mm during 0.7 kPa of pressing, thickness of about 3.5 mm during 2 kPa of pressing, tensile strength in the vertical direction of about 1200 N/5 cm, tensile strength in the latitudinal direction of about 920 N/5 cm, elongation rate in the vertical direction of about 70%, elongation rate in the horizontal direction of about 80%, tear strength in the vertical direction of about 250 N, tear strength in the horizontal direction of about 240 N, water-permeating coefficient in 15° C. water temperature of $4.4 \times 10^{-3}$ m/sec, and bursting strength of about 3200 kPa.

Example 3

A preferable weed barrier sheet has a fabric weight of 2 kg/m$^2$ or more in order to impart weight stress on the weeds, has a light transmittance of 10% or less for each wavelength measured per every 1 nm in a wavelength range of 400 nm or more and 800 nm or less to absorb sunlight and suppress photosynthesis of the weeds under the weed barrier sheet, and to absorb sunlight to raise the temperature of the weed barrier sheet per se in order to impart heat stress on the weeds under the weed barrier sheet.

Moreover, a reflecting sheet being the reflecting layer 14 on the surface, and a weed barrier sheet being the weed barrier layer 15 as the back surface are integrated to obtain the sheet-like reflector 4 as a laminated structure.

The reflector 4 may also be formed by integrating the reflecting sheet and weed barrier sheet with: a method of employing a laminating apparatus to laminate and integrate the reflecting sheet and weed barrier sheet with heat lamination; a method of thermocompression bonding the reflecting sheet and weed barrier sheet with a heat press apparatus; a method of integrating the reflecting sheet and weed barrier sheet by bonding the entire surfaces thereof using an adhesive etc., or pasting these together with points or lines of adhesive etc.; or by a method to integrate these by means of a needle punch, etc.

This sheet-like reflector 4 is formed, for example, in a width of 1.0 to 2.5 m, length of 10 to 100 m and is manufactured, stored and then transported in a rolled state etc. Moreover, when laying the reflector 4, by unwinding it from the rolled state, deploying it on the site ground 7, laying a plurality of reflectors 4 in parallel in the width direction, and connecting and fixing these to each other, the site ground 7 will be covered so as to have no gaps.

The reflector 4 in the present embodiment needs to have a certain water permeability overall. The water permeability from the surface of reflector 4 towards the back surface can be expressed as a water-permeating coefficient, $1.0 \times 10^{-5}$ to 1.0 m/sec, which favourably leads rainwater etc. to the lower surface of the sheet. The water-permeating coefficient is further preferably $5.0 \times 10^{-5}$ to 1.0 m/sec. If the water-permeating coefficient is at the lower limit value or more, the effect of leading rainwater to the lower surface of the sheet is enhanced. Moreover, if the water-permeating coefficient is at the upper limit value or less, the weight stress of the reflector is sufficiently exhibited, a favourable weed barrier effect is obtainable, and cushioning against roughness of the ground is further obtainable. This water-permeating coefficient can be measured by the method according to JIS A 1218 'Testing methods for permeability of saturated soils'.

In this reflector 4, a sheet material having excellent water flowability and chemical resistance is configured of a layer-like single body; for example, a sheet material such as Geoflow (trade name) manufactured by Daipla Corporation can be utilized, where a black embossed-type three-dimensional structural sheet is used as a water-draining core material, and a long fibre spunbond non-woven fabric is used as a protective material. Moreover, a sheet configured of a three-dimensional mesh-like body such as a net inserted between the upper and lower non-woven fabric may also be configured as a base material.

Next, the third embodiment according to the present invention is explained.

In this third embodiment, the same reference signs are used for the members equivalent to those shown in the aforementioned first embodiment, and will be explained with reference to FIG. 1.

In this third embodiment, similar to the aforementioned first embodiment, the reflector 4 faces the lower surface of the power generation surface 12 of the solar power generation panels 2 and is installed on site ground 7 underneath the trestles 3.

The reflector 4 is sheet-like, and is configured of a reflecting layer 14 which forms the upper surface and a weed barrier layer 15 which forms the lower surface, where each of these layers constitutes an integrated laminate.

The reflecting layer 14 comprises a material with a highly light-reflective white colour made to reflect the light, of the directly incident light of sunlight and scattered light of sunlight, in the wavelengths used in power generation, and is a reflecting sheet configured of a flexible material such as resin sheet or rubber sheet.

Moreover, the weed barrier layer 15 is a weed barrier sheet provided with a water shielding property and light-shielding property and comprising e.g. a black material, and configured of a flexible material such as resin sheet or rubber sheet.

Moreover, the reflecting sheet and weed barrier sheet are integrated by lamination, and configured into the reflector 4 made into one single sheet material.

The reflector 4 has a thickness of 1.0 to 2.0 mm, and preferably 1.0 to 1.3 mm, and of this thickness, the thickness of the reflecting layer 14 preferably has a thickness of about 0.4 mm.

Also in this third embodiment, the surface of reflecting layer 14 constituting the reflector 4 is configured to have a water shielding property, where the water shielding coefficient is $1.0 \times 10^{-11}$ m/sec or less, and thereby rainwater and water drops can be favourably led from the surface towards the outside. Moreover, the reflecting layer 14 and the weed barrier layer 15 both have a light-shielding property, and thus a weed barrier effect is obtainable.

As the resin material constituting the reflecting layer 14 in this third embodiment, thermoplastic resin, olefin-based resin and white pigment are mixed in prescribed weight percentages.

Examples of thermoplastic resins include olefin-based resin, vinyl chloride resin, polyester resin, rubber, thermoplastic elastomer, polystyrene resin, fluorine resin, nylon resin, and preferably include an olefin-based resin, and more preferably a low density polyethylene and linear low density polyethylene.

Examples of olefin-based resins include: ethylene-based resins such as low density polyethylene, linear low density polyethylene utilizing a Ziegler catalyst, linear low density polyethylene utilizing a metallocene catalyst; and polypropylene resins such as ethylene-vinyl acetate copolymer, homo-polypropylene, random propylene copolymer. Particularly preferable is the use of at least one or more kinds of linear low density polyethylene utilizing a metallocene catalyst.

Examples of white pigment include titanium oxide, zirconium oxide, calcium carbonate, calcium sulfate, zinc oxide, barium sulfate, barium carbonate, silica, alumina, kaolin, clay, talc, white clay, aluminium hydroxide, magnesium carbonate, white hollow resin emulsion, and preferably include titanium oxide.

In addition to the aforementioned resin and pigment on this reflecting layer 14, a weather resisting agent, for example a UV light absorbing agent and light stabilizer may be mixed in.

As the resin material constituting the weed barrier layer 15, thermoplastic resin, olefin-based resin and black pigment are mixed in prescribed weight percentages.

The thermoplastic resin and olefin-based resin are made from equivalent resin materials constituting the aforementioned reflecting layer 14.

Examples of black pigment include: the carbon blacks such as furnace black, lamp black, acetylene black, channel black; metals such as copper oxides and iron oxides; and organic pigments such as aniline black, and preferably include made from the carbon blacks.

Moreover, a reflecting sheet which forms the reflecting layer 14 on the surface, and a weed barrier sheet which forms the weed barrier layer 15 as the back surface, are integrated to obtain the sheet-like reflector 4 as a laminated structure. The integrated reflector 4 forms a sheet material where the surface colour is white and the back surface colour is black.

The integration of the reflecting sheet and weed barrier sheet is performed by a method such as employing an extrusion moulding apparatus to obtain the reflector 4 by a process of co-extrusion moulding both sheets so as to form a two-layer single body, or by a method such as employing a laminating apparatus to laminate and integrate the reflecting sheet and weed barrier sheet with heat lamination. Furthermore, the reflector 4 may also be formed by a method of thermocompression bonding the reflecting sheet and weed barrier sheet with a heat press apparatus, or integrating the reflecting sheet and weed barrier sheet by bonding the entire surfaces thereof using an adhesive etc., or pasting these together with points or lines of adhesive etc.

This sheet-like reflector 4 is formed, for example, in a width of 1.0 to 2.5 m, length of 10 to 100 m and is manufactured, stored and then transported in a rolled state etc. Moreover, when laying the reflector 4, by unwinding it from the rolled state, deploying it on the site ground 7, laying a plurality of reflectors 4 in parallel in the width direction, and connecting and fixing these to each other, the site ground 7 will be covered so as to have no gaps.

Moreover, weed barrier layer 15 may also be further configured by laminating a non-woven fabric similarly to first embodiment. In such a case, suitably used is a non-woven fabric having a weight of about 310 g/m², thickness of about 3.8 mm during 0.7 kPa of pressing, thickness of about 3.5 mm during 2 kPa of pressing, tensile strength in the vertical direction of about 1200 N/5 cm, tensile strength in the latitudinal direction of about 920 N/5 cm, elongation rate in the vertical direction of about 70%, elongation rate in the horizontal direction of about 80%, tear strength in the vertical direction of about 250 N, tear strength in the horizontal direction of about 240 N, water-permeating coefficient in 15° C. water temperature of $4.4 \times 10^{-3}$ m/sec, and bursting strength of about 3200 kPa. When a weed barrier layer comprising this non-woven fabric is configured, similarly to the aforementioned first embodiment, with the surface as the reflecting layer 14 and the non-woven fabric as the back surface, these are bonded together and integrated by means of a joining method such as a heat press method, heat emboss adhesive method, adhering by hot melt adhesive, ultrasound adhesive method, high frequency adhesive method, to obtain the sheet-like reflector 4 as a laminated structure.

A reflector whose reflecting sheet and weed barrier sheet are laminated and integrated into one single sheet material, which is the third embodiment, preferably has the following physical properties.

The reflector preferably has a tearing strength of 60 N or more and 300 N or less, and more preferably 70 N or more and 250 N or less, and furthermore preferably 90 N or more and 200 N or less. A tearing strength at the lower limit value or more can obtain a reflector which is not easily torn upon impact. The reflector has flexibility with the tearing strength at the upper limit value or less, and the reflecting surface can form a flat or nearly flat gently sloping surface, even if installed on a non-flat ground.

The reflector is utilized as a welded joint body by overlapping the aforementioned edge portions in the width direction. However, the junction part shear strength of such reflectors is preferably 70 N/cm or more and 400 N/cm or less, and further preferably 100 N/cm or more 300 N/cm or less. This junction part shear strength being at the lower limit value or more suppresses the sheets peeling from the overlapping portions during construction. Moreover, the overlapping portions have flexibility with the junction part shear strength at the upper limit value or less, and the reflecting surface can form a flat or nearly flat gently sloping surface, even if installed on a non-flat ground.

The reflector preferably has a tensile strength of 140 N/cm or more and 1000 N/cm or less, and more preferably 200 N/cm or more and 800 N/cm or less. The reflector has sufficient strength and excellent workability with a tensile strength at the lower limit value or more. Moreover, the reflector has flexibility with a tensile strength at the upper limit value or less, and the reflecting surface can form a flat or nearly flat gently sloping surface, even if installed on a non-flat ground.

Furthermore, the tensile strength in the condition where this reflector was used for a long period; namely, after long-term weather resistance, is preferably 100 N/cm or more and 1000 N/cm or less, and more preferably 200 N/cm or more and 800 N/cm or less. The reflector has sufficient weather resistance with a tensile strength after long-term weather resistance in the aforementioned range, a balance between strength and flexibility can be kept over a long period, and thereby the frequency of exchange can be reduced.

The reflector preferably has a tensile elongation at break of 300% or more and 1000% or less, more preferably 400% or more and 900% or less, and furthermore preferably 600% or more and 800% or less. The reflector has flexibility with a tensile elongation at break at the lower limit value or more, and the reflecting surface can form a flat or nearly flat gently sloping surface, even if installed on a non-flat ground. Moreover, the reflector has sufficient strength and excellent workability with a tensile strength at the upper limit value or less.

Furthermore, the tensile elongation at break in the condition where this reflector was used for a long period; namely, after long-term weather resistance, is preferably 250 or more and 1000% or less, more preferably 400% or more and 900% or less, and furthermore preferably 500% or more and 800% or less. The reflector has sufficient weather resistance with a tensile elongation at break after long-term weather resistance within the aforementioned range, a balance between strength and flexibility can be kept over a long period, and thereby the frequency of exchange can be reduced.

The visible light reflectivity in the condition where this reflector was used for a long period; namely, after long-term weather resistance, is preferably 55% or more, further preferably 65% or more, and still furthermore preferably 70% or more. The reflector has sufficient weather resistance with a visible light reflectivity after long-term weather resistance in the aforementioned numerical values or higher, reflected light can be efficiently incident on the lower surface of the power generation surface of the solar power generation panels over a long period, and thus power generation efficiency can be maintained.

The infrared reflectivity, in a state of before and after usage of the reflector; namely, before the reflector is in a long-term weather resistance condition and after long-term weather resistance, is preferably 1% or more and 15% or less, and more preferably 3% or more and 10% or less. With the infrared reflectivity in the before and after long-term weather resistance within the aforementioned range, exothermic heat emission by the solar power generation panels due to light in a wavelength of the infrared region is suppressed, and power generation efficiency reduction can thereby be prevented.

Examples of the third embodiment are explained below.

Regarding the compounding agents respectively constituting the reflecting layer 14 and weed barrier layer 15, the examples will be explained below using the following abbreviations: thermoplastic resin is PE1; olefin-based resin is PE2; white pigment is W-M13, black pigment is B-M13, and weather resisting agent is UV-MB.

[Compounding Agent]

The compounding agents used in the examples are as follows.

PE1=Metallocene linear low density polyethylene with melting point: 98° C., MFR: 2.0 g/10 min (JIS K 7210-1, temperature 190° C., load 2.16 kg) and density: 0.908 g/cm³

PE2=High-pressure low density polyethylene with melting point: 111° C., MFR: 0.35 g/10 min (JIS K 7210-1, temperature 190° C., load 2.16 kg) and density: 0.922 g/cm³;

as physical property items, having as basic physical properties, MFR of 0.35 g/10 min (JIS K 7210-1, temperature 190° C., load 2.16 kg) and density of 922 kg/m³;

as mechanical properties, tensile breaking stress of 20 MPa, tensile breaking elongation of 650%, tensile impact strength of 470 KJ/m², bending rigidity rate of 225 MPa, durometer hardness of 55D, environment stress crack resistance of 9 Hr;

weight of PE2, and 8% by weight of B-MB. A reflector, having a reflecting layer 14 of 0.31 mm and a weed barrier layer 15 of 1.19 mm, for a total thickness of 1.5 mm was prepared.

The respective mixtures of these examples are illustrated in Table 1.

TABLE 1

| | | | | | Example 1 | Example 2 | Example 3 |
|---|---|---|---|---|---|---|---|
| Reflector | Reflecting layer | Mixture | PE1 | wt % | 59 | 45 | 73 |
| | | | PE2 | wt % | 27 | 36 | 18 |
| | | | W-MB | wt % | 9 | 9 | 9 |
| | | | UV-MB | wt % | 5 | 10 | — |
| | | Mixture total | | | 100 | 100 | 100 |
| | Weed barrier layer | Mixture | PE1 | wt % | 75 | 75 | 74 |
| | | | PE2 | wt % | 19 | 19 | 18 |
| | | | B-MB | wt % | 6 | 6 | 8 |
| | | Mixture total | | | 100 | 100 | 100 |
| | Total thickness | | | mm | 1.14 | 1.14 | 1.5 |
| | Reflecting layer thickness | | | mm | 0.40 | 0.40 | 0.31 | as thermal properties, Vicat softening temperature of 97° C. and melting temperature (DSC) of 111° C.; and having the characteristics of being additive-free and high strength W-MB=Polyethylene master batch containing 83 wt % of titanium dioxide with density: 2.5 g/cm³

UV-MB=Polyethylene master batch containing 20 wt % of a hindered amine-based light stabilizer (dimethyl succinate, 1-(2 hydroxyethyl)-4-hydroxy-2,2,6,6-tetramethyl-4-piperidine polycondensate) with melting point: 110° C. and density: 0.995 g/cm³

B-MB=Low density polyethylene master batch containing 40 wt % of carbon black

Preparation Procedure

Example 1

59% by weight of PE1, 27% by weight of PE2, 9% by weight of W-MB, and 5% by weight of UV-MB were mixed as the reflecting layer 14. Also, 75% by weight of PE1, 19% by weight of PE2, and 6% by weight of B-MB were mixed as the weed barrier layer 15. Each of these were charged into a respective extruder. A reflector with a total thickness of 1.14 mm, having a reflecting layer 14 of 0.40 mm and a weed barrier layer 15 of 0.74 mm, was prepared by the co-extrusion method.

Example 2

With the same procedure as that of the aforementioned, 45% by weight of PE1, 36% by weight of PE2, 9% by weight of W-MB, and 10% by weight of UV-MB were used to prepare a reflector with a total thickness of 1.14 mm, the reflector having a reflecting layer 14 of 0.40 mm and a weed barrier layer 15 of 0.74 mm.

Example 3

With the same procedure as that of the aforementioned, a reflecting layer 14 was prepared by mixing 73% by weight of PE1, 18% by weight of PE2, and 9% by weight of W-MB, but mixing no UV-MB. Moreover, a weed barrier layer 15 was prepared by mixing 74% by weight of PE1, 18% by

[Evaluation]

The reflectors of the three examples prepared according to the aforementioned preparation procedure were evaluated in accordance with the below-mentioned items. The results thereof are illustrated in Table 2.

<Test Item 1: Tearing Strength>

Utilizing the reflectors of each Example, the tearing strength was measured in accordance with the '6.6 Tear test' described in '6. Testing method for synthetic rubber and rigid resin-based water shielding sheets' in the 'Water shielding engineering technique and construction management manual' (issued by JLSTA: May 2019 edition).

<Test Item 2: Shear Strength of Junction Part of Sheets>

Using two panels of each reflector prepared in each of the examples, the edge portions of these two reflectors were overlapped with an overlapping margin width of 120 mm, and employing a Twinny model automatic welder manufactured by Leister, pressure was applied with a roll (of 15 mm, with two rows of pressing portions) whilst blowing heat at 500° C. to obtain a welded joint. This was subsequently cooled to room temperature. The overlapping margin was cut in the middle in the overlapping direction with a length of 250 mm and width of 25 mm. Using the samples of the obtained strips for each example, the maximum load of tensile speed of 200 mm/min at break was measured at the position of this overlapping margin.

The tensile strength was calculated by the below formula to obtain the shear strength of junction part of sheets.

Tensile strength (N/cm)=maximum load (N)=width of sample piece (cm)

<Test Item 3: Tensile Strength and Test Item 4: Tensile Elongation at Break>

Utilizing the reflectors of each Example, the tensile strength and tensile elongation at break were measured in accordance with the '6.5 Tensile test' described in '6. Testing method for synthetic rubber and rigid resin-based water shielding sheets' in the 'Water shielding engineering technique and construction management manual' (issued by JLSTA: May 2019 edition).

Samples were collected before and after the exposure test (long-term weather resistance test) and these were respectively measured. The exposure test is as follows.

Exposure test: Testing was performed employing a Sunshine Weather Meter (Model number: Sunshine Weather Meter S80BBR) manufactured by Suga Test Instruments Co Ltd, in accordance with JIS A 1415-1999 and JIS K 7350-4-1996, with the below-mentioned conditions.

Test Conditions

Black panel temperature: 63±3° C.

Relative humidity: 50±5%

Radiation degree of sample surface: 255±10% w/m$^2$ (wavelength range 300 to 700 nm)

Water spray cycle: water injection 18±0.5 minutes, stop water injection 102±0.5 minutes Irradiation time period: 3000 hours <Test Item 5: Reflectivity of Visible Light (360 to 830 nm)>

Samples of the reflector of each example from the aforementioned exposure test were cut into 20×20 mm pieces. These obtained samples were used to measure the total reflectivity of reflecting layer 14 in a wavelength range of 190 to 2500 nm, utilizing an integrating sphere. A spectrophotometer (UH4150) manufactured by Hitachi High-Tech Science Corporation was used. The total reflectivity in wavelength range of 360 to 830 nm was averaged using an aluminium oxide (Al$_2$O$_3$ white board) as a standard sample, and this was configured to be the visible light reflectivity. Measurement was performed with N=3.

(Apparatuses Used for Visible Light Reflectivity Measurement)

Utilizing a ɸ60 mm integrating sphere, spectralon-coated inner surface

Incidence angle: 23°

Number of scans: 64

Wavelength range: 1.3 to 20.0 μm (7800 to 500 cm$^{-1}$)

Light source: MIR

Detector: MCT

Beam splitter: OptKBr

Sampling interval: 2 cm$^{-1}$

Measurement environment: room temperature (20° C.), in atmosphere

Device used: FT-IR Spotlight 400 (manufactured by Perkin Elmer)

<Test Item 7: External Appearance of Reflecting Layer>

Using the reflector of each example as samples from the aforementioned exposure test, the reflecting layer 14 was observed with a microscope at 50 times magnification, and the condition of occurrence of cracks and occurrence of peeling was evaluated.

⊚ (Excellent): No cracks could be seen

○ (Good): There were cracks but no peeling of the reflecting layer

× (Poor): There were a large number of cracks, as well as peeling of the reflecting layer The aforementioned evaluation results of the reflectors of each example are illustrated in Table 2.

TABLE 2

| Test Item | | Unit | Example 1 | Example 2 | Example 3 |
|---|---|---|---|---|---|
| Tearing strength | | N | 116 | 109 | 166 |
| Shear strength of junction part of sheets | | N/cm | 131 | 129 | 131 |
| Tensile strength | before exposure | N/cm | 432 | 413 | 644 |
| | after exposure | N/cm | 464 | 442 | 301 |
| Tensile elongation at break | before exposure | % | 730 | 700 | 712 |
| | after exposure | % | 770 | 760 | 600 |
| Reflectivity of visible light (360 to 830 nm) | after exposure | % | 82.5 | 80.0 | 73.2 |
| Reflectivity of infrared (3.2 to 19.8 μm) | before exposure | % | 8.1 | 8.6 | 6.5 |
| | after exposure | % | 7.5 | 7.7 | 4.4 |
| External appearance of reflecting layer | after exposure | | ⊚ | ⊚ | ○ |

Wavelength range: 190 to 2500 nm

Scan speed: 600 nm/min

Slit width: 5 nm

Sampling interval: 5 nm

Measurement environment: room temperature (25° C.), in atmosphere

Device used: Hitachi spectrophotometer: UH4150 (manufactured by Hitachi High-Tech Science Corporation)

<Test Item 6: Reflectivity of Infrared (3.2 to 19.8 μm)>

Reflectors of each example were cut into 20×20 mm sample pieces. Employing a Fourier transform infrared spectroscopic analyser (Spotlight 400) manufactured by Perkin Elmer Japan, these obtained sample pieces were used to measure the relative reflectivity using a gold mirror as a standard, and the regular reflectivity of a reflecting layer in a wavelength range of 1.3 to 20.0 μm was thereby measured. The regular reflectivity in the infrared region of 3.2 to 19.8 μm was averaged, and this was configured to be the infrared reflectivity. Measurement was performed with N=3. The samples were collected before and after the aforementioned exposure test, and these were each measured.

(Apparatuses Used for Infrared Reflectivity)

Relative reflectivity measurement (regular reflectivity measurement) using a gold mirror as a standard As the results after exposure, compared to Example 3 which had no weather resisting agent (UV-MB) mixed in, there was no reduction respectively in the tensile strength, tensile elongation at break, visible light reflectivity, and infrared reflectivity of the reflectors of Example 1 and Example 2 in which a weather resisting agent was mixed in, and it is thus understood that weather resistance is excellent. Moreover, in the visible light reflectivity, upon having confirmed the deterioration acceleration situation after 3000 hours with an enlarged photograph, although the occurrence of cracks was confirmed as the condition of the surface in Example 3, there was no peeling of the reflecting layer 14, and there was no problem in utilizing any of the reflectors.

Meanwhile, there was no remarkable appearance of cracks in Example 1 and Example 2, and thus it became known that deterioration was inhibited and light reflectivity reduction was suppressed because of the weather resisting agent mixture. Namely, suitable results were obtained as the reflector 4 used in a solar power generation system.

An example of the colour of a surface of the reflecting sheet constituting a reflecting layer forming the surface being white was explained with the configuration of the aforementioned reflector. However, a metallic layer may also be formed on the surface, as a sheet material with a highly light-reflective colour constituting this reflecting sheet and made to reflect directly incident light of sunlight and scattered light of sunlight. The surface of the reflecting sheet with this metallic layer has a metallic gloss colour due to the metallic layer.

For example, a reflecting sheet with metallic foil may also be configured of a metallic foil such as aluminium foil formed on the surface. The aforementioned resin sheet, for example, is made to be a base material of this reflecting sheet with metallic foil, where a metallic foil with a thickness of 0.5 to 1.0 mm is configured to be formed on the surface which becomes one side of a resin sheet, which is this base material.

Because all of the sunlight would be reflected if using a metallic foil, countermeasures against heat would be necessary because, as aforementioned, the light in the infrared region is also reflected. Therefore, in order to avoid glossiness; namely, a regular reflection like a mirror surface, it is preferable to apply a matte coating, form the surface as a rough surface such as by surface texturing, remove the infrared similar to the aforementioned methods, or provide a filter or coating to absorb the infrared light.

Moreover, in addition to metallic foil, a metallic coating may also be configured to form a film on the resin sheet, and a reflecting surface may also be formed by means such as deposition, coating or plating.

Furthermore, in addition to the aforementioned aluminium, at least one light reflecting agent selected from a powder such as titanium oxide, alumina, talc, calcium carbonate, zinc oxide, silica, mica powder, powder glass, powder nickel and powder aluminium may be formed as a film, and may also be configured of a hue from silver to nearly white.

Moreover, a transparent protective film may also be formed by coating the surface of the aforementioned metallic layer etc. This protective film is made of a coating film etc. comprising, for example, a resin material such as polyethylene resin, and preferably configured so as to also provide water-repellence and anti-fouling property.

Next, the installation procedure of the aforementioned solar power generation system 1 is explained.

The procedure explained below is the so-called "reform" procedure where conventional solar power generation systems which have already been constructed would be replaced with the solar power generation system 1 of the present invention and the site and trestles of the system are re-used.

First, weed removing takes place within the site. Because weeds may be growing underneath the solar power generation panels and underneath the trestles within the site, weed removal work such as cutting these away is performed.

Next, the roots of the weeds are exterminated. The roots should be removed from within the soil to the extent possible because the weeds may grow out again from the roots. Moreover, herbicide may also be scattered here.

Next, the laying of the reflector 4 underneath the trestles 3 is performed. If the foundations 11 which constitute the trestles 3 are in a state of being buried in the ground, the sheet-like reflector 4 is cut out to correspond to the sections of these foundations 11, and is laid on site ground 7 whilst avoiding the foundations 11. With the weed barrier layer 15 facing downward and the reflecting layer 14 facing upward, the reflector 4 at this time covers site ground 7 so as to closely adhere to the extent possible to the site ground 7. Moreover, the reflector 4 is spread out all over at the sections where trestles 3 are installed, and also further outward about 2 m from the outermost periphery thereof. The reflector 4 is fixed to the ground by penetrating pin-shaped fasteners 17 through at prescribed intervals. If the reflector 4 is in a rolled state as described above, it is spread out all over whilst unwinding, and fixed by adhering or welding so as to be joined to each other in the width direction.

Next, the existing solar power generation panels are removed.

The existing solar power generation panels connected and fixed to trestles 3 are disengaged from the trestles 3 and are all removed. The electrically connected portions are also pulled out at this time.

Next, the double-sided incidence-type solar power generation panels 2, which are the solar power generation panels of the present embodiment, are installed. Because the trestles 3 are already assembled, the new solar power generation panels 2 are mounted onto the trestles 3, and are then sequentially connected and fixed. If the inclination angle needs to be corrected at this time, the angle is adjusted and fixed.

Then, each of the solar power generation panels 2 is electrically connected etc., and the installation is complete.

Next, the action of the aforementioned configuration is explained.

With the solar power generation system 1 according to the present embodiment, existing solar power generation panels of only a single side are replaced with the double-sided incidence-type power generation panels 2, and laying the reflector 4 which is made to reflect directly incident light of sunlight and scattered light of sunlight on the site ground 7 can increase the amount of power generation.

Namely, if solar power generation panels of an existing solar power generation system have only a single-sided power generation surface, and the power generation amount is 250 W per panel, 4000 panels are necessary to obtain 1000 kW (1 MW). However, in the present embodiment, with the double-sided incidence-type solar power generation panels 2 of which a power generation amount of 320 W is obtainable with the double sides per panel, installing the same number of 4000 panels can obtain a 1280 kW power generation amount, and although in comparison with the rated output power generation amount, there is an increase of the power generation amount of 1.28 times.

Therefore, a 1000 kW power generation amount similar to the amount prior to the replacement is obtainable with 3125 panels with the aforementioned solar power generation panels 2 of the solar power generation system 1 of the present embodiment. In other words, because the size per panel of solar power generation panels 2 is nearly the same, the total area of the entire solar power generation panels 2 can be decreased by about 22%.

Namely, during reconstruction, the installation area and the number of panels of the solar power generation panels 2 can be reduced and the same power generation amount as before can be configured, hence a solar power generation system 1 can be constructed in which the prior site can be made narrow and small, and the same power generation amount can be obtained.

The extent to which the solar power generation panels can actually convert the irradiated sunlight energy into electric power energy, and the ratio thereof is expressed as conversion efficiency.

For example, as an existing single-side power generation type of solar power generation panel, the SRM296P-72N manufactured by SANIX (hereinunder referred to as panel A) has a conversion efficiency of 15.2% with a rated output of 296 W. As a double-sided power generation type of solar power generation panel, the TSM-440DEG17M manufactured by Trina Solar (hereinunder referred to as panel B) has a conversion efficiency of 19.9% with a rated output of 440 W. Therefore, it is understood that panel B has an improved conversion efficiency compared to panel A, with more power generation amount per unit area $m^2$, so that space-saving can be achieved even with a single unit; namely, costs for construction can be suppressed and reduced.

Comparing these solar power generation panels (the aforementioned panel A and panel B) by configuring the total output number to be substantially equivalent, there are 18 panels with panel A and 12 panels with panel B, hence 5328 W according to panel A and 5280 W according to panel B. Although there is a difference of 48 W in these numerical values, in order to compare this and the power generation amount per panel output, the power generation amount, when converting by combining the actual power generation amount of 2361 W of panel A with panel B, is 5280÷5328×2361=2339 W. By comparing the power generation amount of this panel A=2339 W with the actual power generation amount of panel B of 3374 W, it is understood from 3374÷2339 that there is an improvement of 144.2%.

With panel B, the back surface is also a product which generates power, hence power generation efficiency is further made to improve by the configuration including reflector 4 of the present invention, and thus space-saving can be further achieved, thus achieving cost reduction.

Compared to solar power generation panels which generate power from only a single side, the power generation amount of the double-sided incidence-type solar power generation panels can improve to about 30 to 50% because of the double-sided power generation surface.

Therefore, the solar power generation system 1 can increase the electric power sales revenue from the power generation.

For example, for 3.5 hours of inclined surface sun irradiation amount, if the annual power generation amount per 1 MW is 1,277,500 kwh only by the upper surface of a power generation surface, and if the FIT (fixed price purchase system; feed-in tariff) is 40 JPY, the electric power sales revenue would be expected to be 51,100,000 JPY.

With a 30% increase in the power generation amount of the solar power generation system 1 of the present invention; namely, of a system provided with the power generation surfaces 6 and 12 on both sides and comprising the reflector 4, the revenue from electric power sales would be 66,430,000 JPY, which would be an annual profit increase difference of 15,330,000 JPY.

If there remain 15 years for the period of electric power sales with this system, there would be an increase in electric power sales of about 230 million JPY.

Figure 4:
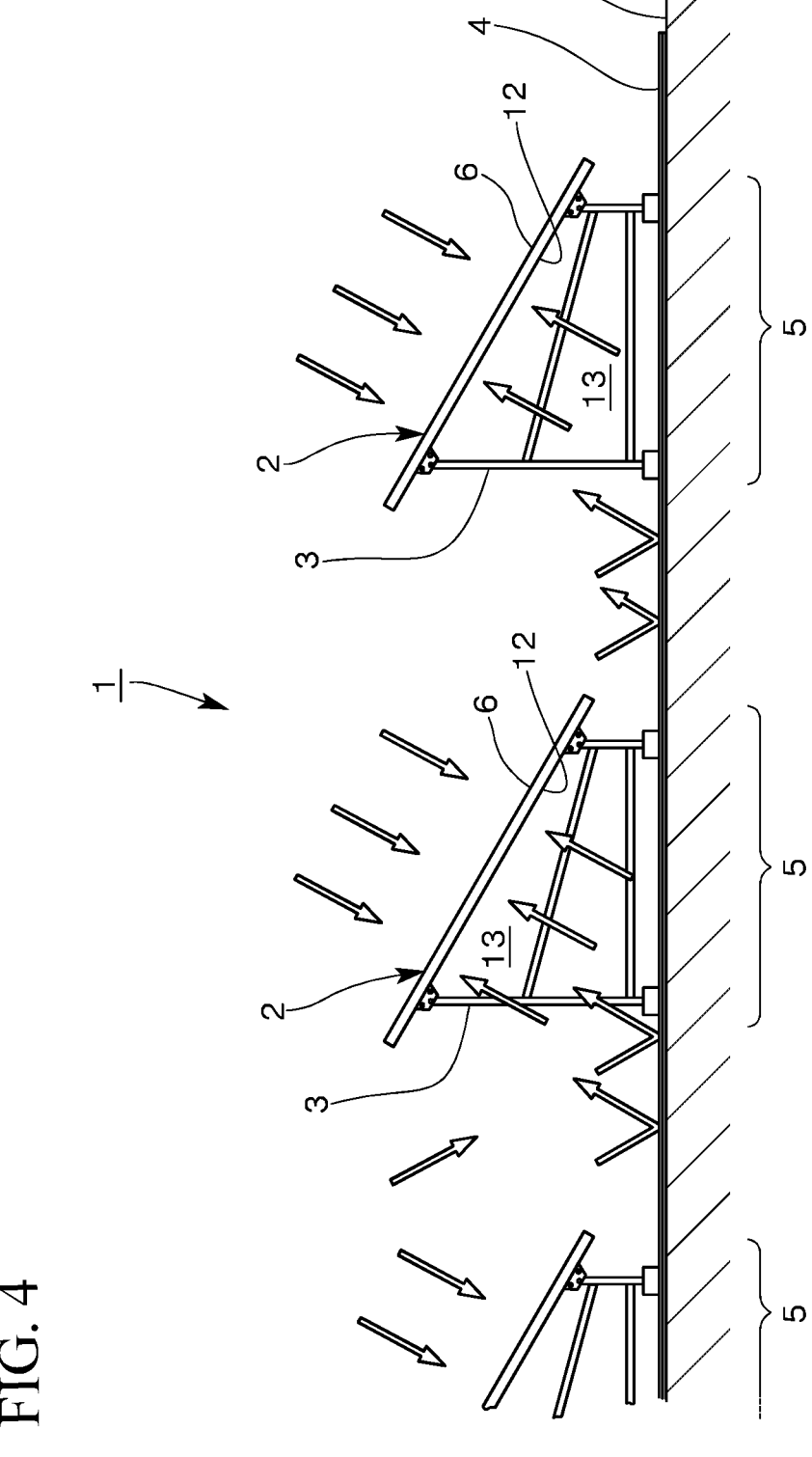
FIG. 4 is a partially enlarged schematic side view illustrating the action of a solar power generation system.

FIG. 4 is a partially enlarged schematic side view illustrating the action of a solar power generation system.

Thus, with the solar power generation system 1 of the present embodiment, directly incident light of sunlight is incident on the upper surface of power generation surface 6 of the installed double-sided incidence-type solar power generation panels 2. Furthermore, reflected light of directly incident light of sunlight and scattered light of sunlight reflected by reflecting layer 14, is incident onto the lower surface of the power generation surface 12 with high reflectivity, and thus power is generated by these double-sided power generation surfaces 6 and 12. By laying the reflector 4 under the light passage space 13 underneath the trestles 3, on the site ground 7 in the outer periphery of the arranged trestles 3, reflected light shines well onto the lower surface of the power generation surface 12 in the solar power generation panels 2 via a prescribed distance and space, and thus power generation by this lower surface of the power generation surface 12 is promoted.

Thereby, according to the solar power generation system 1 of the present embodiment, the power generation amount can be improved by the double-sided incidence-type solar power generation panels 2 compared to that of the conventional system, and it is effective also when obtaining a large power generation amount to the extent possible in a limited site space, and hence the solar power generation system 1 can be constructed with consideration for environment.

Moreover, according to the reflector 4 of solar power generation system 1 of the present embodiment, weed growth of the site ground 7 is suppressed by the weed barrier layer 15, and thus expense and labour cost etc. which were required for removing weeds, and the time and expense for the maintenance thereof can be reduced, and hence eliminating the conventional adverse impact to the power generation surface due to weeds will eliminate the cause of reduction in power generation amount, and will greatly reduce costs.

If merely a white-coloured weed barrier sheet were used alone as the configuration of the reflector 4 of the present embodiment described above, directly incident light of sunlight and scattered light of sunlight would not be made to reflect well, and a sufficient power generation amount would not be obtainable. Moreover, in order to obtain a sufficient weed barrier effect, the weed barrier sheet should be configured of a dark colour such as black; otherwise, the withering and death of the weeds cannot be promoted. In other words, if a single layer weed barrier sheet were used as a reflector, an effective amount of sunlight would not be able to be reflected. Accordingly, a single layer weed barrier sheet cannot also serve as the reflecting layer of the present invention. Moreover, a mere configuration of a weed barrier sheet would not obtain sufficient anti-fouling property, and hence cannot be utilized in the solar power generation system of the present invention, taking into consideration the maintenance.

The present invention is not limited to the aforementioned embodiments, hence it is intended in the present invention to also mutually combine each configuration of the embodiments, as well as change and apply each configuration of the embodiments by the person skilled in the art, based on the description in the specification and well-known technique, hence these are included in the scope of protection hereby requested.

For example, replacement of the existing solar power generation system; namely, a system configured of single-side type solar power generation panels, with the configuration of the present invention was explained with the aforementioned configuration examples. However, this solar power generation system 1 may also be newly installed.

In this case, construction may begin from laying the reflector 4 on the site ground 7, and may be completed by the installation procedures of installing the trestles 3 and attaching the double-sided incidence-type solar power generation panels 2.

At this time, the number of solar power generation panels 2 to be installed on the site 7 may be calculated, which is calculated from the required power generation amount. Because the power generation amount will increase with the solar power generation system 1 of the present invention compared to that of the conventional system, the system 1 of the present invention can be configured in a site with smaller area.

Moreover, an example of the colour of the surface of reflector 4 being white was given; however, this reflecting layer 14 is not limited to the aforementioned colour, and may also be a pale grey colour, high-intensity colour, or have colour vividness and colour tone etc., where the reflecting layer 14 can be any colour if directly incident light of sunlight and scattered light of sunlight is made to reflect well; namely, if the colour has a high light reflectivity. For example, if the reflecting layer 14 is a bright green colour, green-based colour, has colour vividness and colour tone, or patterns such as camouflage colour etc., directly incident light of sunlight and scattered light of sunlight can be reflected well and be effective at the lower surface of the power generation surface 12 in the solar power generation panels 2, whilst reducing the feeling of the reflecting layer 14 appearing out of place in an environment having trees etc. in the periphery thereof.

Furthermore, an example was mentioned where a reflecting sheet constituting the reflecting layer 14 was formed with a resin sheet as a base material and a metallic layer on the surface. However, there is no limitation on this in so far as the light reflection is good. For example, a woven fabric of which a glossing agent was impregnated in the fibre, a woven fabric of which a glossing agent was added in the fibre, a woven fabric configured by entwining glossy fibre in the warp threads and weft threads, non-woven fabric utilizing such fibres etc. may be formed like a sheet.

Accordingly, in the solar power generation system 1 according to the present embodiment, power generation amount can be made to improve, the site area can be reduced and made smaller, construction costs can be reduced. Moreover, because weeds are suppressed, maintenance costs can also be reduced.

REFERENCE SIGNS LIST

1 . . . Solar power generation system
2 . . . Double-sided incidence-type solar power generation panels (solar power generation panels)
3 . . . Trestles
4 . . . Reflector
6 . . . Upper surface of power generation surface
7 . . . Site ground
12 . . . Lower surface of power generation surface
13 . . . Light passage space
14 . . . Reflecting layer
15 . . . Weed barrier layer
16 . . . Perforated portions

The invention claimed is:

1. A solar power generation system provided with a plurality of solar power generation panels installed via trestles wherein an upper surface of a power generation surface is made to incline towards a sunlight incidence direction at a predetermined angle, wherein said solar power generation panels comprise double-sided incidence-type solar power generation panels provided with power generation surfaces on both said upper surface and a lower surface, said trestles are set at a predetermined height and a light passage space is provided below a lower surface of power generation surface of said double-sided incidence-type solar power generation panels, said solar power generation system comprises a reflector laid so as to cover a site ground underneath said double-sided incidence-type solar power generation panels and the periphery thereof, wherein said reflector is provided with a reflecting layer having a light-reflecting surface comprising a sheet material with light-reflective colour wherein a surface side facing said lower surface of power generation surface of said double-sided incidence-type solar power generation panels reflects directly incident light of sunlight and scattered light of sunlight towards said lower surface of power generation surface, wherein the sheet material of said reflecting layer has a thickness in a range of 0.5 mm to 3.0 mm, and wherein the sheet material of said reflecting layer is a resin sheet or a rubber sheet, and a weed barrier layer comprising a weed barrier sheet material wherein a back surface side faces said site ground and is in contact with said site ground, wherein said reflector is integrally formed by lamination of said reflecting layer and said weed barrier layer; and wherein each of said reflecting layer and said weed barrier layer contains both a low density polyethylene and a linear low density polyethylene, and wherein a wt % of said linear low density polyethylene in said weed barrier layer is greater than a wt % of said linear low density polyethylene in said reflecting layer.

2. The solar power generation system according to claim 1, wherein the colour of said light-reflecting surface is white.

3. The solar power generation system according to claim 1, wherein said light-reflecting surface has a light reflectivity of sunlight in a 500 nm to 1000 nm wavelength of 70% or more, and an average light reflectivity of sunlight in a 5000 nm to 20000 nm wavelength of 15% or less.

4. The solar power generation system according to claim 1, wherein a surface of a reflecting layer constituting said reflector has a water shielding property, wherein a water shielding coefficient of said reflector is $1.0 \times 10^{-11}$ m/sec or less.

5. The solar power generation system according to claim 1, wherein said reflector is provided with water permeability having a water-permeating coefficient of said reflector of $1.0 \times 10^{-5}$ m/sec to 1.0 m/sec.

6. The solar power generation system according to claim 1, further comprising a UV light deterioration preventing layer at a surface of said reflecting layer.

7. The solar power generation system according to claim 1, wherein said reflector has a tensile strength in a range of 140 N/cm or more and 1000 N/cm or less.

8. The solar power generation system according to claim 1, wherein said reflector has a tensile elongation at break in a range of 300% or more and 1000% or less.

9. A reflector for solar power generation system, said reflector being used in a solar power generation system provided with a plurality of double-sided incidence-type solar power generation panels installed via trestles wherein an upper surface of a power generation surface is made to incline towards a sunlight incidence direction at a predetermined angle, wherein said reflector comprises:

a reflecting layer having a light-reflecting surface comprising a sheet material with light-reflective colour made to reflect directly incident light of sunlight and scattered light of sunlight towards a lower surface of power generation surface of said solar power generation panels, wherein the sheet material of said reflecting layer has a thickness in a range of 0.5 mm to 3.0 mm, and wherein the sheet material of said reflecting layer is a resin sheet or a rubber sheet, and a weed barrier layer comprising a weed barrier sheet material, wherein said reflector is integrally formed by a lamination of said reflecting layer and said weed barrier layer, a thickness of said reflector is 1.0 mm or more; and wherein each of said reflecting layer and said weed barrier layer contains both a low density polyethylene and a linear low density polyethylene, and wherein a wt % of said linear low density polyethylene in said weed barrier layer is greater than a wt % of said linear low density polyethylene in said reflecting layer.

10. The reflector for solar power generation system according to claim 9, wherein the colour of said light-reflecting surface is white.

11. The reflector for solar power generation system according to claim 9, wherein said light-reflecting surface has a light reflectivity of sunlight in a 500 nm to 1000 nm wavelength of 70% or more, and an average light reflectivity of sunlight in a 5000 nm to 20000 nm wavelength of 15% or less.

12. The reflector for solar power generation system according to claim 9, wherein a surface of a reflecting layer constituting said reflector has a water shielding property, wherein a water shielding coefficient of said reflector is $1.0 \times 10^{-11}$ m/sec or less.

13. The reflector for solar power generation system according to claim 9, wherein said reflector is provided with water permeability having a water-permeating coefficient of said reflector of $1.0 \times 10^{-5}$ m/sec to 1.0 m/sec.

14. The reflector for solar power generation system according to claim 9, wherein a UV light deterioration preventing layer is provided at a surface of said reflecting layer.

15. The reflector for solar power generation system according to claim 10, wherein said reflecting layer contains a white pigment.

16. The reflector for solar power generation system according to claim 10, wherein said weed barrier layer contains a black pigment.

17. The reflector for solar power generation system according to claim 9, wherein said reflector has a tensile strength in a range of 140 N/cm or more and 1000 N/cm or less.

18. The reflector for solar power generation system according to claim 9, wherein said reflector has a tensile elongation at break of 300% or more and 1000% or less.

* * * * *